United States Patent
Desai et al.

(10) Patent No.: US 11,207,640 B2
(45) Date of Patent: Dec. 28, 2021

(54) SYSTEM AND METHOD FOR ADJUSTING CARBON DIOXIDE CONCENTRATION IN INDOOR ATMOSPHERES

(71) Applicant: Palo Alto Research Center Incorporated, Palo Alto, CA (US)

(72) Inventors: Divyaraj Desai, Sunnyvale, CA (US); Jessica Louis Baker Rivest, Palo Alto, CA (US); Gabriel Iftime, Dublin, CA (US); Vedhasri Vedharathinam, Sunnyvale, CA (US); Mahati Chintapalli, Mountain View, CA (US); Junhua Wei, Mountain View, CA (US); Sean Emerson Doris, San Francisco, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 0 days.

(21) Appl. No.: 15/880,780

(22) Filed: Jan. 26, 2018

(65) Prior Publication Data

US 2018/0257027 A1    Sep. 13, 2018

Related U.S. Application Data

(60) Provisional application No. 62/468,350, filed on Mar. 7, 2017, provisional application No. 62/468,332, filed on Mar. 7, 2017.

(51) Int. Cl.

| | |
|---|---|
| *B01D 53/32* | (2006.01) |
| *C08J 5/22* | (2006.01) |
| *F24F 8/192* | (2021.01) |

(52) U.S. Cl.
CPC .......... *B01D 53/326* (2013.01); *C08J 5/2231* (2013.01); *F24F 8/192* (2021.01);

(Continued)

(58) Field of Classification Search
CPC .... B01D 53/326; B01D 61/422; B01D 61/44; B01D 2257/504

See application file for complete search history.

(56) References Cited

U.S. PATENT DOCUMENTS

| 3,511,595 A | 5/1970 | Fuchs |
| 6,793,711 B1 | 9/2004 | Sammells |

(Continued)

FOREIGN PATENT DOCUMENTS

| EP | 2740710 | 6/2014 |
| EP | 2792398 | 10/2014 |
| WO | WO 0170626 | 9/2001 |

OTHER PUBLICATIONS

Basic Water Treatment, section 5.14.1, Polyelectrolytes, p. 77 (Year: 2018).*

(Continued)

*Primary Examiner* — Salil Jain
(74) *Attorney, Agent, or Firm* — Fay Sharpe LLP

(57) ABSTRACT

An electrochemical device suited to modifying a carbon dioxide concentration in an interior space includes a cathode chamber with an inlet which receives a feed gas containing carbon dioxide. A reduction catalyst layer in the cathode chamber reduces carbon dioxide in the gas to form an ionic carrier species. An anode chamber with an outlet outputs a gas comprising carbon dioxide. A solid electrolyte membrane spaces the anode chamber from the cathode chamber and transports the ionic carrier species between the cathode chamber and the anode chamber. The membrane includes an ionic liquid. An oxidation catalyst layer in the anode chamber oxidizes the ionic carrier species to form carbon dioxide. A voltage source provides a voltage difference across the membrane.

19 Claims, 11 Drawing Sheets

(52) U.S. Cl.
CPC .... *B01D 2257/504* (2013.01); *B01D 2313/42* (2013.01); *C08J 2339/04* (2013.01); *Y02C 20/40* (2020.08)

(56) References Cited

U.S. PATENT DOCUMENTS

| | | | | |
|---|---|---|---|---|
| 2008/0286643 | A1* | 11/2008 | Iwasaki | B01D 53/326 |
| | | | | 429/111 |
| 2009/0233155 | A1 | 9/2009 | Littau | |
| 2010/0005959 | A1* | 1/2010 | Littau | B01D 53/228 |
| | | | | 95/51 |
| 2014/0102883 | A1* | 4/2014 | Kamai | C25B 11/035 |
| | | | | 204/242 |
| 2014/0131197 | A1 | 5/2014 | Suzuka et al. | |
| 2014/0326603 | A1 | 11/2014 | Kamai et al. | |
| 2016/0064732 | A1 | 3/2016 | Saroj | |
| 2016/0064763 | A1 | 3/2016 | Sahu | |
| 2016/0376714 | A1* | 12/2016 | Fleischer | C10G 2/50 |
| | | | | 205/462 |
| 2017/0014758 | A1* | 1/2017 | Wilkinson | B01D 61/54 |
| 2018/0111083 | A1* | 4/2018 | Masel | B01D 53/326 |
| 2018/0219240 | A1* | 8/2018 | Gyenge | H01M 8/188 |

OTHER PUBLICATIONS

Allen, et al., "Associations of Cognitive Function Scores with Carbon Dioxide, Ventilation, and Volatile Organic Compound Exposures in Office Workers: A Controlled Exposure Study of Green and Conventional Office Environments," *Environ Health Perspect*, vol. 124 (6), pp. 805-812(2016).

Alvarez-Guerra, et al., "Conversion of carbon dioxide into formate using a continuous electrochemical reduction process in a lead cathode," Chemical engineering Journal, pp. 1-7 (2012).

ASHRAE Standard, Ventilation for Indoor Air Quality, 62-2001, pp. 1-5 (2003).

Benziger, et al., "Oxygen mass transport limitations at the cathode of polymer electrolyte membrane fuel cells," AIChE Journal, vol. 57 (9), pp. 2505-2517 (2011).

Darlington, et al., "The biofiltration of indoor air: implications for air quality," Indoor Air, vol. 10 (1), pp. 39-46 (2000) (Abstract only).

Dunks, et al., "Electrochemical studies of molten sodium carbonate" Inorganic Chemistry, vol. 22 (15), pp. 2168 (1983) (Abstract only).

Gellett, "Solid State Air Purification System," NASA NIAC Phase I Final Report, project # NNX12AR14G, pp. 1-25 (2013).

Hoffman, "NETL Report: Study of regenerable sorbents for CO2 capture," J. Energy Environ. Res., 1.1, pp. 90-100 (2001).

Kaden, et al., "WHO Guidelines for Indoor Air Quality: Formaldehyde," NCBI Bookshelf, pp. 1-39 (2010).

Kadokawa, "Polymerizable ionic liquids: Development to photo functional poly(ionic liquid) materials," TCIMAIL, No. 159, pp. 1-5, downloaded from http://www.tcichemicals.com/en/us/support-download/tcimail/backnumber/article/159drE.pdf on Oct. 30, 2017.

Kim, et al., "A novel ventilation strategy with $CO_2$ capture device and energy saving in buildings," Frontiers in Energy Research, pp. 1-16 (2014).

Lackner, "Capture of carbon dioxide from ambient air." Eur. Phys. J. Special Topics vol. 176(1), pp. 93-106 (2009).

Marcinkoski, et al., "Fuel Cell System Cost—2015," DOE Hydrogen and Fuel Cells Program Record, pp. 1-9 (2015), available at https://www.hydrogen.energy.gov/pdfs/15015_fuel_cell_system_cost_2015.pdf.

Mysen, et al., "Occupancy density and benefits of demand-controlled ventilation in Norwegian primary schools," Energy & Buildings, vol. 37, pp. 1234-1240 (2005) (Abstract only).

Rheinhardt, et al., "Electrochemical Capture and Release of Carbon Dioxide," ACS Energy Lett. vol. (2), pp. 454-461 (2017).

Rice, et al., "Direct formic acid fuel cells," J. of Power Sources, vol. 111(1), pp. 83-89 (2002) (Abstract only).

Satish, et al., "Is $CO_2$ an Indoor Pollutant? Direct Effects of Low-to-Moderate $CO_2$ Concentrations on Human Decision-Making Performance," *Environ. Health Perspectives*, vol. 120 (12), pp. 1671-1677 (2012).

Scovazzo, et al., "Electrochemical separation and concentration of < 1% carbon dioxide from nitrogen," J. Electrochem. Soc., vol. 150.5: pp. D91-D98 (2003) (Abstract only).

Stern, "Electrochemically Mediated Separation for Carbon Capture," Energy Procedia 4, pp. 860-867 (2011).

Ye, Y., et al. "High hydroxide conductivity in polymerized ionic liquid block copolymers," ACS Macro Letters col. 27(7), pp. 575-580 (2013) (Abstract only).

Yuan, et al., "Poly(ionic liquid)s: Polymers expanding classical property profiles", Polymer vol. 52, pp. 1469-1482 (2011).

Zeman, "Energy and Material Balance of $CO_2$ Capture from Ambient Air," Environ. Sci. Technol., vol. 41 (21), pp. 7558-7563 (2007).

"Scout-Baseline Energy Calculator," p. 1, downloaded from https://trynthink.github.io/scout/calculator.html on Oct. 26, 2017.

"Carbon dioxide concentrations in rooms with people," pp. 1-3, downloaded at http://www.engineeringtoolbox.com/pollution-concentration-rooms-d_692.html, on Oct. 26, 2017.

EnVerid Systems Inc.—Commercial Building Technology Demonstration, pp. 1-19 (2016), available at https://energy.gov/sites/prod/files/2016/04/f30/22296_Meriv_040616-1135.pdf.

Office of Solid Waste and Emergency Response, EPA Report EPA 530-R-10-001, "Background Indoor Air Concentrations of Volatile Organic Compounds in North American Residences (1990-2005): A Compilation of Statistics for Assessing Vapor Intrusion," pp. 1-67 (2011).

\* cited by examiner

SYSTEM AND METHOD FOR ADJUSTING CARBON DIOXIDE CONCENTRATION IN INDOOR ATMOSPHERES

This application claims the priority of U.S. Provisional Application Nos. 62/468,350, filed Mar. 7, 2017, and 62/468,332, filed Mar. 7, 2017, both entitled SYSTEM AND METHOD FOR EFFECTIVELY REMOVING INDOOR $CO_2$, by Vedharathinam, et al., the disclosures of which are incorporated herein in their entireties.

BACKGROUND

The exemplary embodiment relates to regulation of carbon dioxide concentrations in the atmosphere of an enclosed space. It finds particular application in connection with an apparatus and method for reducing carbon dioxide from indoor air.

Various methods have been used to adjust the carbon concentration in indoor air. In commercial buildings, frequent ventilation using outdoor air (generally 300-400 ppm carbon dioxide, or less) is often used to ensure that indoor air is maintained at ASHRAE-recommended levels (ASHRAE Standard, Ventilation for Indoor Air Quality, 2003). The cost of ventilation can be quite high. For example, the BTO Market Calculator estimates that 116 MT $CO_2$ is exhaled by occupants in commercial buildings and 2.25 quad ($2.37 \times 10^{12}$ MJ) of energy (primary fuel basis) is consumed by existing HVAC systems in the recirculation and heating or cooling of outside air (see, https://tryn-think.github.io/scout/calculator.html). This corresponds to a high energy cost for what is largely building $CO_2$ removal (about 2.2 MJ $mol^{-1}$ $CO_2$). In the absence of intelligent $CO_2$ removal systems, a significant amount of energy is wasted in excessive ventilation to dilute indoor air to acceptable $CO_2$ levels (Mysen, et al., "Occupancy density and benefits of demand-controlled ventilation in Norwegian primary schools," Energy & Buildings, 37, 1234-1240 (2005)). Given that research now points to the benefits of more stringent air quality standards (below 650 ppm) for occupant productivity, the energy-expensive use of ventilation is expected to increase. (Allen, et al., "Associations of Cognitive Function Scores with Carbon Dioxide, Ventilation, and Volatile Organic Compound Exposures in Office Workers: A Controlled Exposure Study of Green and Conventional Office Environments," Environ Health Perspectives, 124 (6) 805-812 (2016); Satish, et al., "Is $CO_2$ an Indoor Pollutant? Direct Effects of Low-to-Moderate $CO_2$ Concentrations on Human Decision-Making Performance," Environ. Health Perspectives, 120 (12): 1671-1677 (2012)).

Regenerative $CO_2$ removal systems including absorbents have been used to scrub $CO_2$ from indoor air. See, Lackner, "Capture of carbon dioxide from ambient air," European Phys. J. Special Topics 176(1): 93-106 (2009); Hoffman, "NETL Report: Study of regenerable sorbents for $CO_2$ capture," J. Energy Environ. Res., 1.1: 90-100 (2001); U.S. Pat. No. 3,511,595 to Fuchs; W.; Kim, et al., "A novel ventilation strategy with $CO_2$ capture device and energy saving in buildings," Energy and Buildings, 87, 134-141 (2015). The amount of $CO_2$ removal is dependent on the absorbent volume, thus tending to make the system heavy. To regenerate the absorbent for further use, it is heated to a high temperature, above 150° C., at low $CO_2$ partial pressure, to release absorbed $CO_2$ and water vapor. This limits the ability to provide continuous processing of indoor air and also generates a large amount of heat. The specific energy consumption has been estimated at over 1 MJ $mol^{-1}$ $CO_2$ removed (Zeman, "Energy and Material Balance of $CO_2$ Capture from Ambient Air," Environ. Sci. Technol., 41 (21), 7558-7563 (2007)), although a reduction of 29% in the cooling load has been demonstrated in a commercialized sorbent based-system.

Live plants can also provide some indoor $CO_2$ removal, but the ratio of plants to occupants needs to be high, and maintaining healthy plants indoors can be expensive (Darlington, et al., "The biofiltration of indoor air: implications for air quality," Indoor Air, 10 (1): 39-46 (2000))

Electrochemical methods for eliminating indoor $CO_2$ have been proposed. One suggested approach to electrochemical $CO_2$ removal uses a membrane electrolyte containing a quinone carrier (Gellett, "Solid State Air Purification System," NASA NIAC Phase I Final Report, project no. NNX12AR14G (2013)). The carrier, however, has a relatively poor oxygen stability and has demonstrated only low $CO_2$ removal flux. Electrochemical $CO_2$ transport using a 1,4-benzoquinone carrier for electrochemical concentration of $CO_2$ has also been proposed (Scovazzo, et al., "Electrochemical separation and concentration of <1% carbon dioxide from nitrogen," J. Electrochem. Soc., 150.5: D91-D98 (2003)). However, the process requires a high reduction potential (−3 V vs Ag|AgCl) and cannot operate continuously.

There remains a need for an energy-efficient system suitable for continuous removal of carbon dioxide from indoor air.

INCORPORATION BY REFERENCE

The following references, the disclosures of which are incorporated herein by reference in their entireties, are mentioned:

U.S. Pub. No. 20160064763, published Mar. 3, 2016, entitled APPARATUS AND METHOD ASSOCIATED WITH REFORMER-LESS FUEL CELL, by Saroj Sahu, describes a fuel cell membrane based on an ionic liquid fixed in a fine porous ceramic.

U.S. Pat. No. 3,511,595, issued May 12, 1970, entitled METHOD OF REMOVING CARBON DIOXIDE AND WATER VAPOR FROM AIR, by W. Fuchs, describes removal of carbon dioxide from air with an alkali metal carbonate on a particulate carrier.

BRIEF DESCRIPTION

In accordance with one aspect of the exemplary embodiment, an electrochemical device includes a cathode chamber including an inlet which receives a feed gas containing carbon dioxide. A reduction catalyst layer in the cathode chamber reduces carbon dioxide in the gas to form an ionic carrier species. An anode chamber includes an outlet which outputs a gas containing carbon dioxide. An electrolyte membrane spaces the anode chamber from the cathode chamber. The membrane includes an ionic liquid. The membrane transports the ionic carrier species between the cathode chamber and the anode chamber when a voltage difference is applied across the membrane. An oxidation catalyst layer in the anode chamber oxidizes the ionic carrier species to form carbon dioxide. An energy source, electrically connected with at least one of the reduction catalyst layer and the oxidation catalyst layer, provides energy for the reduction and oxidation.

In accordance with another aspect of the exemplary embodiment, an electrolytic carbon dioxide removal apparatus includes an electrochemical device as described above and conduits which connect the cathode chamber inlet and a cathode chamber outlet with an associated interior space, the electrochemical device reducing a partial pressure of carbon dioxide in the interior space.

In accordance with another aspect of the exemplary embodiment, an electrolytic carbon dioxide pumping apparatus includes an electrochemical device as described above and conduits which connect an anode chamber inlet and the anode chamber outlet with an associated interior space, the electrochemical device increasing a partial pressure of carbon dioxide in the interior space.

In accordance with another aspect of the exemplary embodiment, a carbon dioxide detection system includes an electrochemical device as described above and a carbon dioxide sensor.

In accordance with another aspect of the exemplary embodiment, a method for modifying carbon dioxide concentration in an interior space includes providing an electrochemical device as described above, electrochemically reducing carbon dioxide to ionic carrier species in the cathode chamber, ionically transporting the ionic carrier species through the membrane, electrochemically oxidizing the ionic carrier species to carbon dioxide in the anode chamber, and supplying gas from one of the cathode chamber and the anode chamber to the interior space to modify the carbon dioxide concentration in an interior space.

In accordance with another aspect of the exemplary embodiment, a method for carbon dioxide transport includes electrochemical reducing carbon dioxide gas to a mobile ionic species at a first electrode, transporting the mobile ionic species across a solid electrolyte membrane, and oxidizing the ionic species to carbon dioxide at a second electrode.

DETAILED DESCRIPTION

Aspects of the exemplary embodiments relate to an apparatus and method for regulating carbon dioxide concentration of a gaseous environment, which can be predominantly air, in an enclosed space. In one embodiment, an apparatus is described for carbon dioxide removal from a gaseous environment in an indoor space. In another embodiment, an apparatus is described for carbon dioxide addition to a gaseous environment in an indoor space. The devices and methods described herein are suited to continuous $CO_2$ removal/addition from/to indoor air.

The apparatus for electrolytic $CO_2$ removal (ECR) includes an electrochemical device for continuous indoor air purification. The electrochemical device can be a low-power and a low-temperature device, with a form factor that allows for easy installations in a variety of environments. It can allow for increased building-occupant productivity at a fraction of the energy that would be required for increasing ventilation and associated thermal conditioning of fresh air. The $CO_2$ electrochemical device may be coupled with a refrigeration unit or an HVAC unit to remove the $CO_2$ from indoor air and keep it to a safe level of ~1000 ppm, or less. The use of the $CO_2$ electrochemical device allows for a decrease in air recirculation in a building, thus decreasing the overall energy consumption. Alternatively, such a device could also be used for increasing the partial pressure of carbon dioxide in an environment for applications such as greenhouses.

An exemplary electrochemical device is a membrane-electrode-assembly (MEA) based $CO_2$ electrochemical device with an electrolyte membrane that can be easily integrated into, for example, an indoor air conditioning system. In contrast to existing systems using absorbents which operate at high temperatures, the exemplary apparatus and electrochemical method is able to remove $CO_2$ continuously from indoor air at temperatures below 70° C.

Figure 1:
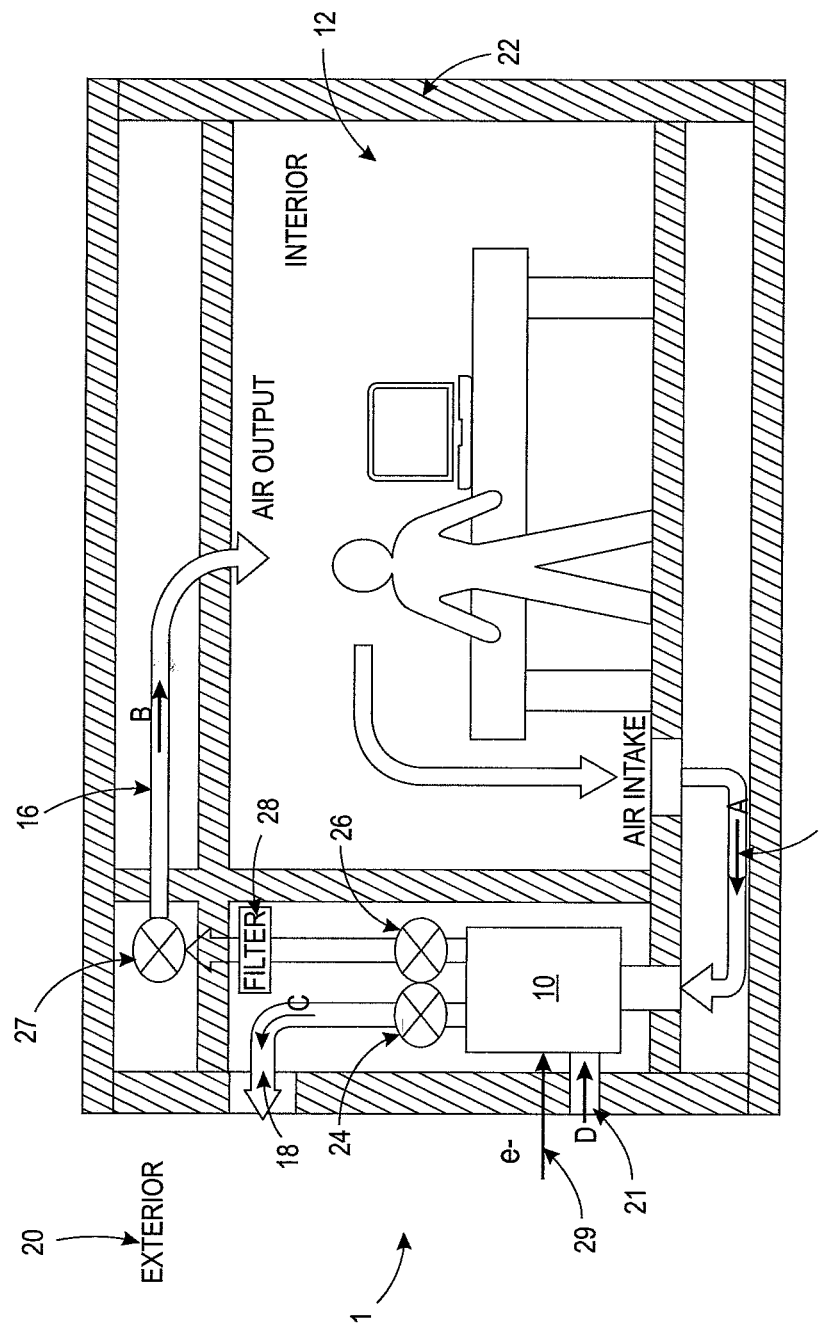
FIG. 1 is a side sectional view of an environment in which a carbon dioxide electrochemical device operates, in accordance with one exemplary embodiment.

FIG. 1 illustrates an environment in which an exemplary electrolytic $CO_2$ removal (ECR) apparatus 1 operates. The apparatus 1 includes an electrochemical device 10 (in this case, a single electrochemical cell), which concentrates a stream of $CO_2$ to be vented outdoors. The electrochemical device shown in FIG. 1 receives a flow A of a carbon dioxide-containing gas, such as indoor air (primarily nitrogen and oxygen, with small amounts of carbon dioxide and water vapor) from an indoor space 12 via an air inlet conduit 14. After removal of carbon dioxide from the air, some or all of the air may be returned to the indoor space via an air outlet conduit 16. The return air flow B has a lower partial pressure of carbon dioxide than the inlet flow A. A carbon dioxide outlet conduit 18 carries a flow C of carbon dioxide, e.g., mixed in air, to an exterior 20 of an enclosing structure 22. A flow of atmospheric air D is received via a conduit 21. The partial pressure of carbon dioxide in the flow C may be higher than in flow A and/or B. The illustrated enclosing structure 22 is a building, although other enclosing structures having an interior space, such as a vehicle, e.g., an automobile, submarine, ship, aircraft, or spacecraft, are also contemplated.

One or more pumps 24, 26 and/or blowers 27 help to circulate the air to and from the electrochemical device via the conduits 14, 16, 18. An air filter(s) 28 may be incorporated in one or more of the conduits 14, 16 to capture volatile organic components and particulates. An electric current for operation of the electrochemical device is supplied by an electric circuit 29. The electrochemical cell 10 (or a stack of such cells) may be installed inside an air conditioner, using the air conditioner fan to drive indoor air to the electrochemical device, thus avoiding the need for an additional fan for the purpose.

Figure 2:
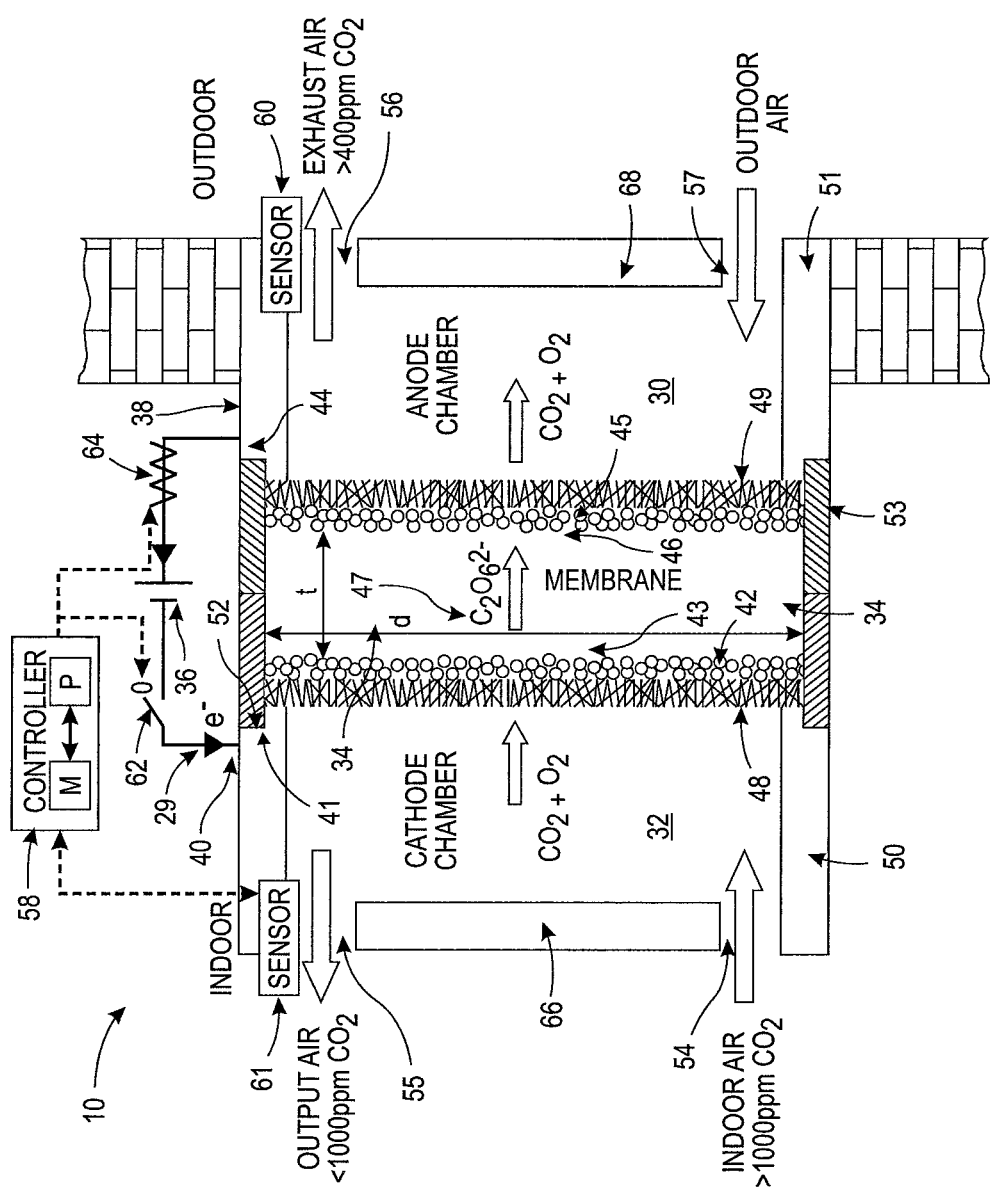
FIG. 2 is a side sectional view of an electrochemical device in accordance with one embodiment.

With reference to FIG. 2, one embodiment of an electrochemical device 10 suited to use in the apparatus of FIG. 1 is shown. The electrochemical device includes an anode chamber 30 and a cathode chamber 32, which are spaced by a solid membrane 34, such as a poly(ionic) liquid-based membrane. A potential is maintained across the membrane 34 by an energy (e.g., voltage) source 36 that is electrically connected to an anode 38 and a cathode 40 in the anode and cathode chambers 30, 32, respectively. The cathode 40 includes a current collector 41 and first catalytic layer 42, disposed in the cathode chamber 32, adjacent to a first surface 43 of the membrane 34. The anode 38 includes a current collector 44 and a second catalytic layer 45, disposed in the anode chamber 30, adjacent an opposite, second surface 46 of the membrane. The current collectors transport electrons but do not catalyze oxidation or reduction of $CO_2$. The first catalytic layer 42 includes a reduction catalyst which catalyzes the reduction of carbon dioxide (and oxygen) to an ionic carbon dioxide carrier species 47. The second catalytic layer 45 includes an oxidation catalyst which catalyzes the oxidation of the ionic carrier species 47 (after transport through the membrane) to carbon dioxide and oxygen. The energy source 36, which is electrically connected with at least one of the reduction catalyst layer and the oxidation catalyst layer, provides energy for the reduction and oxidation reactions that occur therein. The membrane 34 is permeable to the ionic carrier species (anions) 47 but is impermeable or substantially impermeable to gases, in particular, oxygen and carbon dioxide. By "substantially impermeable," it is meant that no more than 5%, or no more than 1% of the respective gas (e.g., oxygen) entering the cathode chamber is carried through the membrane into the anode chamber (and vice versa). Gas diffusion layers 48, 49 may be disposed adjacent one or both of the catalytic layers 42, 45, to aid in distributing the gas flow. The diffusion layers 48, 49 may be formed from a porous material, such as cloth. A second pair of current collectors 50, 51 may be located at the opposite ends of the cell from collectors 40, 44. The current collectors 40, 44, 50, 51 may be formed from an electrically-conductive material, such as copper or steel. The cell may include gaskets 52, 53, one on either end of the membrane, to inhibit gas leakage from the cell and/or between the chambers 32, 30.

An inlet 54 to the cathode chamber 32 receives a feed gas containing carbon dioxide, such as indoor air from the indoor space 12, via the conduit 14 (FIG. 1). The indoor air, after removal of some of the $CO_2$, passes out of an outlet 55 of the cathode chamber, to be returned to the indoor space 12 via the conduit 16. The anode chamber 30 includes an outlet or outlets 56, through which exhaust air, containing regenerated $CO_2$, passes into the conduit 18. An inlet 57 may receive a pressurized flow of outdoor air to mix with the air in the anode chamber and carry it out of the outlet 56.

A controller 58 monitors the gaseous composition in one or more of the airflows A, B, C, D and/or chambers 30, 32, e.g., through the use of one or more gas sensors 60, 61. The controller 58 may include memory M storing instructions for converting signals from the sensor 60 into gas concentration measurements for one or more gases, such as $CO_2$, and instructions for implementing adjustments to the rate of $CO_2$ removal when the detected gas concentration is outside a predefined range. The controller 58 includes a hardware processor P, in communication with the memory, for executing the instructions. When the detected gas concentrations are not within the predetermined range, the controller 58 may communicate with one or more components of the electrochemical device 10 that are able to effect a change in the levels, such as a switch 62 and/or rheostat 64 in the electrical circuit 36. The cell 10 may include a side wall or walls 66, 68 which space(s) the top and bottom current collectors and define the respective inlets and outlets to the cell, or may be connected with other cells to form a stack, as shown in FIG. 3.

Figure 3:
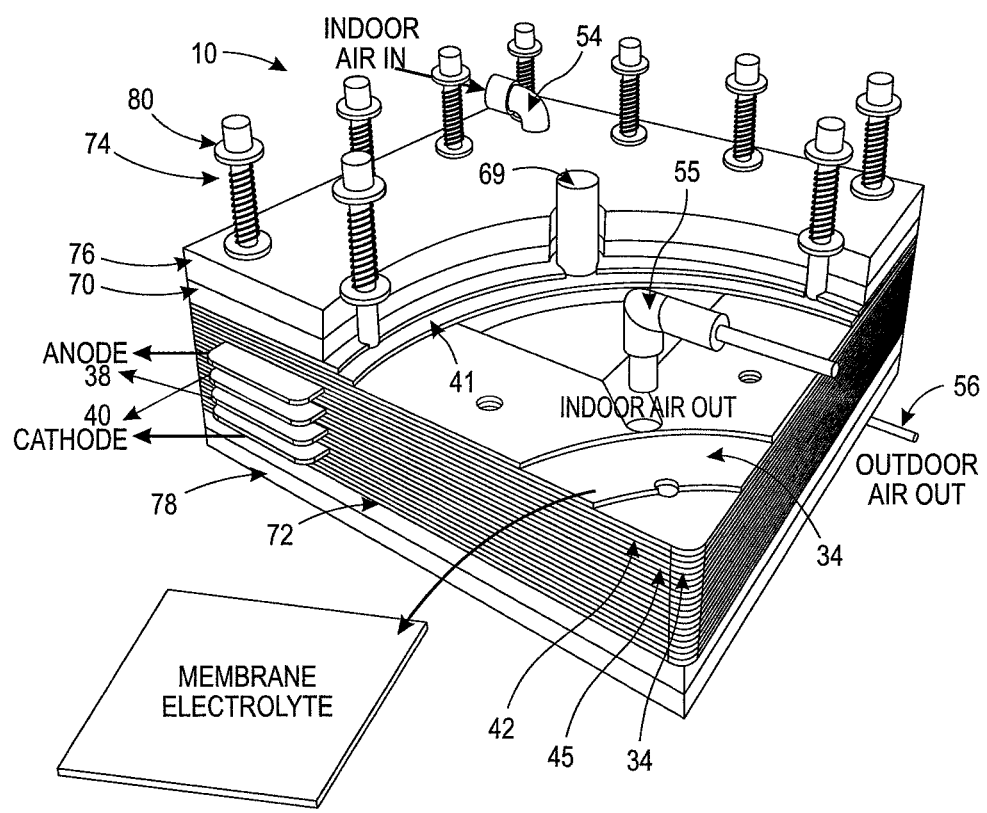
FIG. 3 is a perspective view of an electrochemical device including a stack of electrochemical cells, in accordance with another embodiment.
Figure 4:
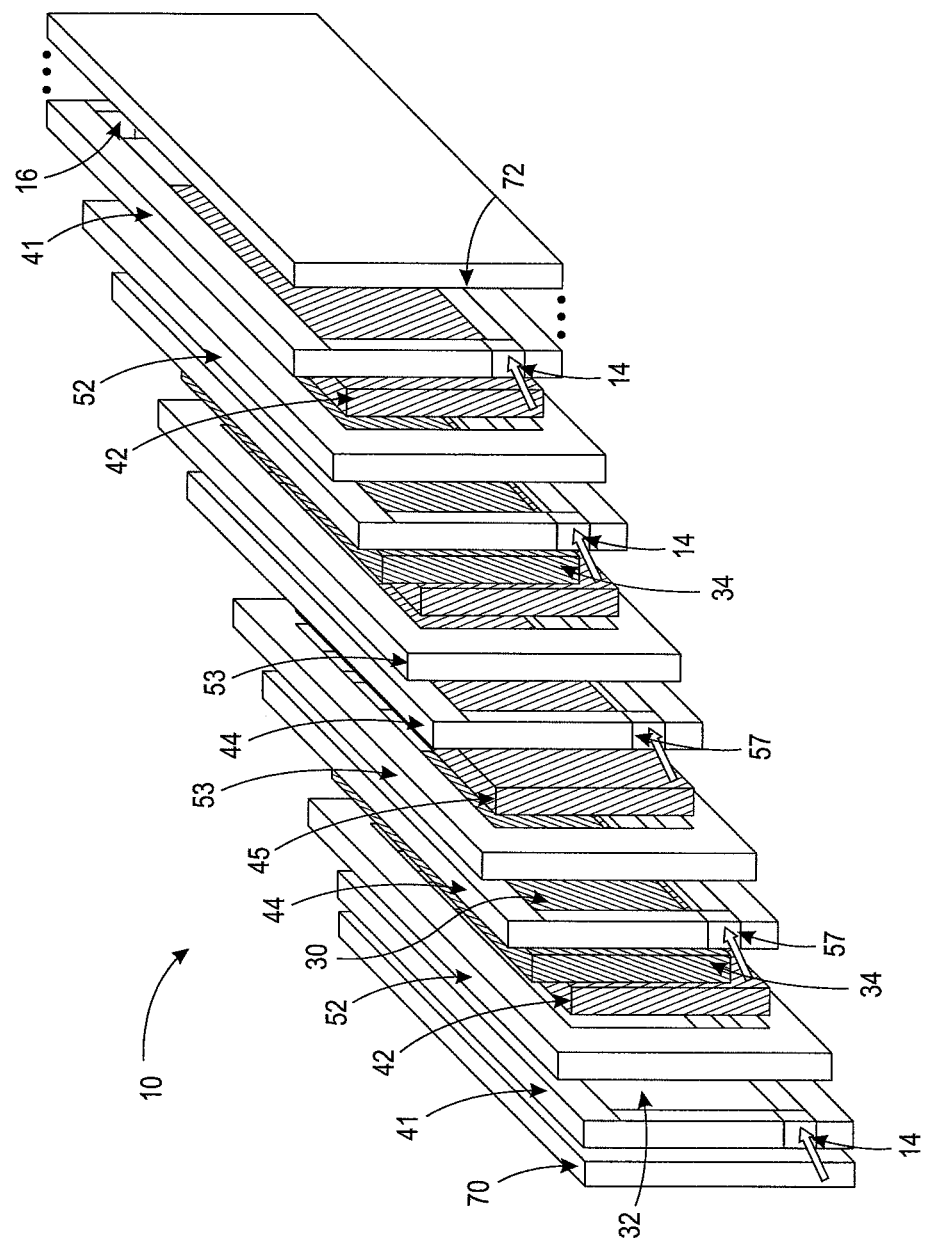
FIG. 4 is an exploded perspective view of the stack of electrochemical cells of FIG. 3.

While a single-celled electrochemical device is illustrated in FIG. 2, a stack of cells may be combined to form the electrochemical device 10, as illustrated in FIGS. 3 and 4, where similar elements are accorded the same numerals. The stack may include at least 2 or at least 5 cells, such as about 10 cells, one on top of the other, which receive air from a common inlet (manifold) 54 and deliver the output air to a common outlet or outlets (manifolds) 55, 56. An electrically-conductive member 69 conducts electrons to the current collectors 41. A similar electrically-conductive member (not shown) conducts electrons from the current collectors 44. The layers 42, 34, and 44 (and 48, 49, if used) which define the cells, may be covered by insulation layers 70, 72, which are held in position by a clamping device 74, here illustrated as including bipolar plates 76, 78 held together by threaded fixing members 80, such as bolts or screws. In one embodiment, the bipolar plates are each a composite graphite plate, such as a fluoro-carbon/graphite composite plate. Other components of the clamping device 74, such as bolts, compression springs, and gas fittings, can be made of steel, plastic, or other rigid material.

The multi-cell electrochemical device stack 10 distributes indoor air into different cells in the stack, with overall pressure and flow rates. The cells are pneumatically in parallel or in series in the stack with the flow rates of air in each cell being balanced. In the embodiment shown in FIG. 4, while the first (left) cell is arranged cathode, membrane anode, the second cell in the stack is reversed, in an anode, membrane, cathode arrangement, and so forth throughout the stack.

Figure 5:
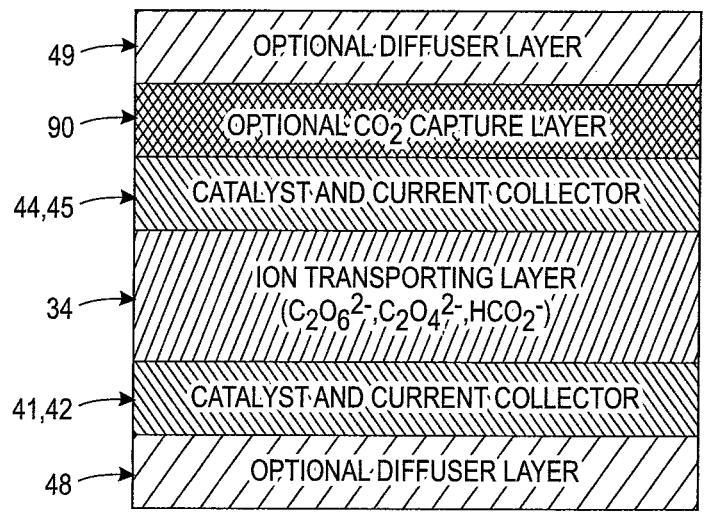
FIG. 5 illustrates results of cyclic voltammetry experiments designed to evaluate the effectiveness of carbon dioxide removal.

The low ambient concentration of $CO_2$ (400 ppm) tends to inhibit the maximum flux that can be maintained across the membrane 34. In one embodiment, the electrochemical device 10, as described with reference to FIGS. 2-4, may further include a $CO_2$ sorbent as a $CO_2$ capture layer 90, on the anode side of the membrane 34, e.g., intermediate the diffuser layer 49 and catalyst layer 45, as illustrated in FIG. 5. The $CO_2$ capture layer 90 is thus positioned on the indoor side of the membrane 34, e.g., spaced from the membrane by the catalyst layer 44. The $CO_2$ capture layer 90 can enhance the $CO_2$ removal rate by elevating the gas concentration in the vicinity of the $CO_2$ reduction electrode (cathode) 40. The $CO_2$ sorbent $CO_2$ in the capture layer 90 may be a liquid (e.g., alkyl amine, or ionic liquid), supported by a conductive porous material (e.g., carbon cloth). Alternatively, the sorbent may be a solid polymer (e.g., a polyamine, such as poly(ethanolamine), or a polymerized ionic liquid).

The exemplary electrochemical device 10, as described in any of the foregoing embodiments is a low power, compact and light weight device that can operate in a continuous mode for indoor $CO_2$ removal and that vents the removed $CO_2$ outdoors. The $CO_2$ from air captured in the cathode side of the electrochemical device, separated by the membrane, is released outdoors through the anode side continuously. As will be appreciated, some of the oxygen from the indoor air may also be reduced, in the process of removing $CO_2$. However, this is a relatively small proportion of the oxygen in the indoor space. For example, about 250 ppm of oxygen may be removed, out of a typical atmospheric content of 210,000 ppm.

The catalytic layers 42, 45 each include one or more catalysts, which may be the same or different. Suitable catalysts for $CO_2$ reduction and/or oxidation of the ionic carrier species to form $CO_2$ include noble metals, such as indium (In), platinum (Pt), palladium (Pd), silver (Ag), gold (Au), ruthenium (Ru), and copper (Cu), other metal catalysts, such as nickel (Ni), lead (Pb), tin (Sn), and zinc (Zn), bimetallic catalysts, such as $Pd_xPt_{100-x}$, and mixtures thereof. In one embodiment, the catalyst in layer 42 is highly selective for conversion of carbon dioxide to the ionic carrier species. As an example, for formate ion generation, the catalyst layer may include at least one of Cu, In, Sn, and Pb. The catalyst in one or both of layers 42, 45 can be supported on a support material, such as carbon black, which can have a high surface area to reduce the catalyst loading. The $CO_2$ reduction catalyst may have a faradaic efficiency of at least 70% with $j_{limiting}$=0.2 mA cm$^{-2}$ measured using a disc electrode.

The membrane(s) 34 of the illustrated electrochemical device 10 may include a solidified liquid electrolyte, such as a poly(ionic) liquid (PIL), or may be an ionic liquid supported on a support material, such as an electrically conductive cloth, e.g., carbon-containing cloth, or other electrically-conductive porous material. Ionic liquids are compounds containing organic cations and anions, which may be liquid at ambient temperatures (10-40° C.). PILs typically melt at a temperature of below 100° C. Suitable PILs for use herein are those in which, under operating temperatures, the cation is immobilized in the form of a polymer, while the anion is free to move through the membrane. Poly(ionic) liquid membranes can be formed by direct synthesis, e.g., by polymerization of ionic liquids, or by functionalization of an existing ion exchange membrane with an electrolyte containing suitable anions. The ionic liquid or poly(ionic) liquid is hydrophobic and may have a water content of less than 1%. The exemplary membrane 34 is thus hydrophobic and highly selective for $CO_2$ absorption, leaving the moisture in the indoor environment. In one embodiment, the membrane 34 is predominantly poly(ionic) liquid, i.e., at least 51 wt. % or at least 70 wt. %, or at least 90 wt. % poly(ionic) liquid, or up to 100 wt. % poly(ionic) liquid.

Thin uniform membranes 34 can be made with a thickness t of, for example, 10-500 μm, e.g., at least 20 μm, such as up to 200 μm, or up to 100 μm, e.g., of the order of 50 μm thickness. The membrane 34 may have a diameter d (or largest dimension) of at least 0.5 cm, such as up to 50 cm, depending on the application. The membrane may be flexible, allowing it to return to its original shape after a deflection.

In one embodiment, the membrane 34 includes an aprotic, optionally polymerized, ionic liquid. Particularly suitable ionic liquids have a wide electrochemical window (>3.5 to 7 V), low vapor pressure ($P_{vap}$ less than 100 Pa at 298 K), high ionic conductivity (0.1 to 50 mS/cm), and low melting point, all of which are desirable properties for gas-based electrochemical applications.

Example organic cations in the ionic liquid or poly(ionic) liquid may be selected from nitrogen-containing cations, phosphorus-containing cations, sulfur-containing cations, oxalates, and combinations thereof.

Exemplary nitrogen-containing cations include heterocyclic and acyclic nitrogen-containing cations, such as imidazolium, pyridinium, piperidinium, and pyrrolidinium-containing cations, organo-ammonium cations, and mixtures thereof.

Suitable heterocyclic nitrogen-containing cations are 5 and 6 membered heterocyclic ions of the general form:

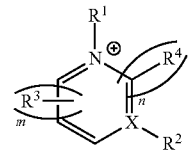

where $R^1$, $R^2$, $R^3$ and $R^4$ are independently selected from H, $C_1$-$C_{12}$ alkyl groups, $C_1$-$C_{12}$ alkoxy groups, $C_1$-$C_{12}$ hydroxyalkyl groups, $C_1$-$C_{12}$ alkenyl groups, $C_1$-$C_{12}$ hydroxyalkenyl groups and combinations thereof, and wherein at least one, or at least two of $R^1$, $R^2$, $R^3$ and $R^4$ (where present) is/are not H, such as $R^1$, and wherein one, two or more of $R^1$, $R^2$, $R^3$ and $R^4$ may be polymerizable groups, such as $R^1$ and/or $R^2$, e.g., unsaturated $C_2$-$C_{12}$ polymerizable group(s), such as $C_1$-$C_{12}$ alkenyl groups and $C_1$-$C_{12}$ hydroxyalkenyl groups;

X is C or N;
n is 0 or 1; and
m is 0 or from 1-5.

$R^3$ can be other than H and can be attached to any of the ring members, including X, except for the protonated nitrogen group.

Exemplary imidazolium cations include mono-, di- and tri- $C_1$-$C_{12}$ alkyl, alkenyl, alkoxy, and hydroxyalkyl imidazolium cations, such as 1,3-dimethylimidazolium, 1,3-diethylimidazolium, 1-ethyl-3-methylimidazolium, 1,2-dimethyl-3-propylimidazolium, 1,3-dipropylimidazolium, 1-ethyl-3-propylimidazolium, 1,2-dimethyl-3-N-butylimidazolium, 1-ethyl-3-butylimidazolium, 1-methyl-3-octylimidazolium, 1-ethyl-3-octylimidazolium, 1-n-propyl-3-methylimidazolium, 1-n-propyl-3-ethylimidazolium, 1-butyl-3-methylimidazolium, 1-butyl-3-ethylimidazolium, 1-butyl-2,3-dimethylimidazolium, 1-butyl-2,3-diethylimidazolium, 1-hexyl-3-methylimidazolium, 1-hexyl-3-ethylimidazolium, 1-octyl-3-methylimidazolium, and 1-octyl-3-ethylimidazolium, ions, polymerizable equivalents thereof, e.g., with vinyl or other alkenyl functional group, which may be at the 1-position and/or 3-position of the ring, such as 1-vinylimidazolium, 1-propynylimidazolium, 1-vinyl-3-ethenylimidazolium, 1-ethenyl-3-propynylimidazolium, 1,3-dipropynylimidazolium, 2-methyl-1-vinylimidazolium, mixtures thereof, and polymers thereof.

Exemplary pyridinium cations include $C_1$-$C_{12}$ alkyl, alkoxy, and hydroxyalkyl pyridinium cations, such as 1-(2-methoxyethyl)-1-methylpyridinium, N-(3-hydroxypropyl) pyridinium, and N-hexylpyridinium cations, polymerizable equivalents thereof, such as 1-ethenyl-3-propenylpyridinium, 4-vinylpyridinium, 2-vinylpyridinium, and mixtures thereof.

Exemplary pyrrolidinium cations include $C_1$-$C_{12}$ alkyl, alkenyl, alkoxy, and hydroxyalkyl pyrrolidinium cations, such as 1-butyl-1-methylpyrrolidinium, N-butyl-N-methylpyrrolidinium, and 1-hexyl-1-methylpyrrolidinium, polymerizable equivalents thereof, such as 1-ethenyl-3-propenylpyrrolidinium, mixtures thereof, and polymers thereof.

Suitable organo-ammonium cations are of the general form:

where $R^1$, $R^2$, $R^3$, and $R^4$ are independently selected from H, $C_1$-$C_{12}$ alkyl groups, $C_1$-$C_{12}$ alkoxy groups, polymerizable equivalents thereof, and combinations thereof, and wherein at least one or at least two of $R^1$, $R^2$, $R^3$, and $R^4$ is/are not H. Exemplary organo-ammonium cations include $C_1$-$C_{12}$ alkyl and alkoxy ammonium cations, such as trimethylbutylammonium, N-ethyl-N,N-dimethyl-2-methoxyethylammonium, tetrabutylammonium, n-hexyltriethylammonium, trimethyl-n-hexylammonium, and triethylbutylammonium cations.

Exemplary phosphorus-containing cations include phosphonium ions, such as $C_1$-$C_{12}$ alkyl and alkenyl phosphonium ions, such as trihexyl (tetradecyl)phosphonium and tris(n-hexyl) tetradecylphosphonium ions.

The organic cation may include at least one unsaturated polymerizable group at the cationic site, which can be cross-linked by free radical polymerization. Suitable unsaturated polymerizable groups include alpha-unsaturated $C_2$-$C_{12}$ alkenyl groups, e.g., ethenyl, propenyl, and butenyl groups.

One example polymerizable cation is an imidazolium cation, such as a 1-vinyl imidazolium cation, which is polymerized through the vinyl group.

Exemplary anions in the poly(ionic) liquid include oxalate $(C_2O_4)^{2-}$, hydroxide, sulfonates, such as trifluoromethanesulfonate; acetates, such as trifluoroacetate; phosphates, such as pentafluoroethyltrifluorophosphate, trifluorotris (pentafluoroethyl)phosphate, diphosphate, and hexafluorophosphate; carboxylates, such as formate, $C_1$-$C_{12}$ alkyl formates, such as methyl formate, ethyl formate, metal formates, such as sodium formate; borates, such as tetrafluoroborate and tetracyanoborate; imide ions, such as bis(trifluoromethylsulfonyl)imide (also known as bis(trifluoromethane)sulfonimide); amide ions, such as cyanamide; halides, such as chloride; sulfates, such as $C_1$-$C_{12}$ alkyl sulfates, e.g., ethylsulfate, and mixtures thereof.

Exemplary ionic liquids and polyionic liquids formed from such anions and cations include:

1. Piperidines, such as 1-(3-methoxypropyl)-1-methylpiperidinium bis (trifluoromethylsulfonyl) imide, and 1-(2-methoxyethyl)-1-methylpiperidinium tris-(pentafluoroethyl) trifluorophosphate.

2. Phosphonates, such as trihexyl (tetradecyl)phosphonium tris (pentafluoroethyl)trifluorophosphate, trihexyl (tetradecyl)phosphonium chloride, tris(n-hexyl) tetradecylphosphonium trifluorotris (pentafluoroethyl) phosphate, tris(n-hexyl)tetradecylphosphonium bis (trifluoromethylsulfonyl)imide, trihexyl(tetradecyl)phosphonium dicyanamide, and N-allylphosphonium formate.

3. Pyridines, such as 1-(2-methoxyethyl)-1-methylpyridinium tris (pentafluoroethyl)trifluorophosphate, N-(3-hydroxypropyl)pyridinium bis (trifluoromethylsulfonyl)imide, and N-hexylpyridinium bis(trifluoromethylsulfonyl) imide.

4. Pyrollidines, such as 1-butyl-1-methylpyrrolidinium trifluoromethanesulfonate, N-butyl-N-methylpyrrolidinium bis (trifluoromethanesulfonyl)imide, 1-hexyl-1-methyl-pyrrolidinium bis (trifluoromethylsulfonyl)imide, and 1-butyl-1-methylpyrrolidinium trifluoroacetate.

5. Monosubstituted, disubstituted, and trisubstituted imidazoles, such as 1-ethyl-3-methylimidazolium tetracyanoborate, 1-methyl-3-octylimidazolium bis(trifluoromethylsulfonyl)imide, 1,2-dimethyl-3-N-butylimidazolium hexafluorophosphate, 1,2-dimethyl-3-propylimidazolium bis (trifluoromethylsulfonyl)imide, 1,3-dimethylimidazolium diphosphate, 1,3-dimethylimidazolium trifluoromethanesulfonate, 1-ethyl-3-methylimidazolium bis (trifluoromethylsulfonyl)imide, 1-ethyl-3-methylimidazolium ethylsulfate, 1-ethyl-3-methylimidazolium tetrafluoroborate, 1-ethyl-3-methylimidazolium trifluoromethanesulfonate, 1-n-propyl-3-methylimidazolium tetrafluoroborate, 1-butyl-3-methylimidazolium tetracyanoborate, 1-butyl-2,3-dimethylimidazolium trifluoromethanesulfonate, 1-butyl-2,3-methylimidazolium bis (trifluoromethanesulfonyl)imide, 1-butyl-3-methylimidazolium bis (trifluoromethylsulfonyl)imide, 1-butyl-3-methylimidazolium hexafluorophosphate, 1-butyl-3-methylimidazolium tetrafluoroborate, 1-n-butyl-3-methylimidazolium tetrafluoroborate, 1-hexyl-3-methylimidazolium chloride, 1-hexyl-3-methylimidazolium trifluorotris (pentafluoroethyl)phosphate, 1-hexyl-3-methylimidazolium bis (trifluoromethylsulfonyl)imide, 1-hexyl-3-methylimidazolium tetracyanoborate, 1-octyl-3-methylimidazolium chloride, N-vinyl imidazolium formate, 1-ethyl, 3-methyl imidazolium hydroxide, and 1-vinylimidazolium trifluoroacetate.

6. Organo-ammoniums, such as trimethylbutylammonium bis (trifluoromethylsulfonyl)imide, N-ethyl-N,N-dimethyl-2-methoxyethylammonium bis(trifluoromethylsulfonyl)imide, n-hexyltriethylammonium bis (trifluoromethylsulfonyl) imide, trimethyl-n-hexylammonium bis (trifluoromethylsulfonyl)imide, triethylbutylammonium bis (trifluoromethylsulfonyl)imide, and tetrabutylammonium hexafluorophosphate.

Mixtures of these ionic liquids may be used. Polymerized ionic liquids formed from cations with unsaturated groups, wherein the cationic polymer may be infiltrated with the corresponding anions, are also contemplated.

One example ionic liquid is a poly(EMIM) TFSI electrolyte, where EMIM=1-ethyl-3-methylimidazolium, TFSI=bis (trifluoromethane)sulfonimide):

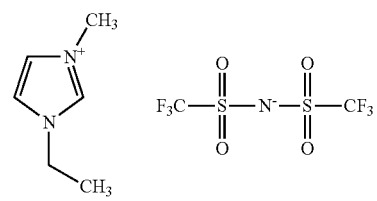

Another example ionic liquid includes a poly(1-vinylimidazolium) compound and wherein the mobile anion is selected from oxalate, formate, acetate and trifluoroacetate. For example, the ionic liquid is a polymer of 1-vinylimidazolium formate, which is polymerized through the vinyl group, using a free radical initiator. As an example, poly (vinylimidazole) formate is formed by polymerization of 1-vinylimidazolium cations:

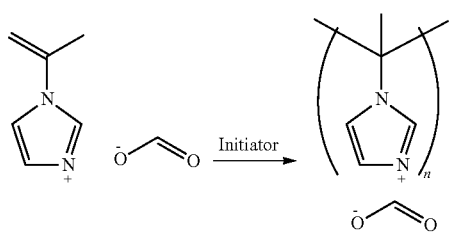

Alternatively, the formate group is introduced after polymerization, e.g., by ion exchange:

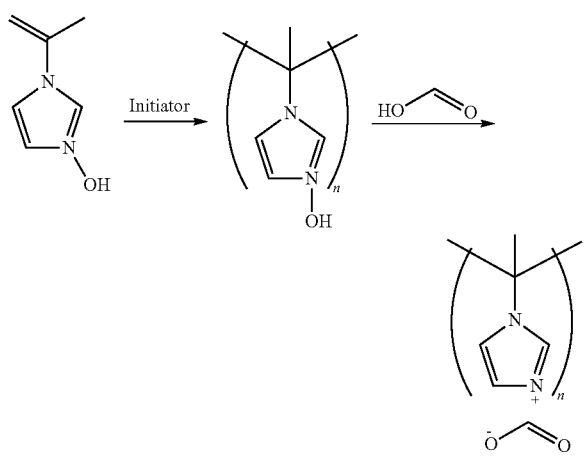

In either method, the result is a polymer backbone of n repeating units each with a pendent imidazolium cationic group, where n may be, for example, at least 2, or at least 10, or at least 50. The formate anions are mobile.

Other specific examples of ionic liquids are polymerized hydroxide-based ionic liquids, such as 1-ethyl, 3-methyl imidazolium hydroxide (also known as poly(EMIM) hydroxide). The use of polymerized ionic liquid hydroxides has been studied for use in anion exchange membrane research, and conductivity of up to $10^{-3}$ S/cm has been reported for block copolymers. (Ye, Y., et al., "High hydroxide conductivity in polymerized ionic liquid block copolymers," ACS Macro Letters, 2(7): 575-580 (2013)).

In one embodiment, the ionic liquid is selected by a combination of one of the following cationic groups: imidazolium, phosphonium, pyridinium, piperidinium, and ammonium, and one of the following anionic groups: trifluoromethanesulfonate, trifluoromethanesulfonylimide, trifluoroacetate, acetate, formate, oxalate, tetrafluoroborate, and hexafluorophosphate.

In one embodiment, the membrane is a selectively functionalized ion exchange membrane in which the mobile species is a selective ionic $CO_2$ carrier, such as oxalate, formate, acetate or trifluoroacetate.

Exemplary polymerizable monomers suitable as cross-linking agents for forming a solid matrix containing the ionic liquid include vinyl-substituted aromatic monomers, such as styrene and alpha-methyl styrene; vinyl aliphatic monomers, in particular, $C_1$-$C_{12}$ alpha-olefins, such as ethylene, propylene, and butylene; (meth)acrylate monomers, such as polyethylene glycol diacrylate (PEGDA); allyl monomers, such as polyethylene oxide, polyethylene glycol; and dimers and oligomers and mixtures thereof.

The membrane 34 may further include a non-aqueous and non-volatile plasticizer, such as ethylene carbonate, propylene carbonate, dimethoxy ethane, dimethyl sulfoxide, tetrahydrofuran, or acetonitrile, which may be present at no more than 25% of the total membrane volume.

Exemplary ionic carrier species 47 include peroxydicarbonate ions ($C_2O_6^{2-}$), formate ions ($HCOO^-$), oxalate ions ($C_2O_4)^{2-}$, carbonate ions ($CO_3^{2-}$), trifluoroacetate ions ($CF_3CO_2^-$), and combinations thereof. All of these anions include both carbon and oxygen and optionally another element, such as hydrogen or fluorine. In one specific embodiment, the ion carrier species is peroxydicarbonate ion ($C_2O_6^{2-}$). The carrier species 47 may be the same as or different from the anion in the organic liquid.

The transport of $CO_2$ can be achieved using $CO_2$ reduction to yield the ionic carrier species 47, or through the formation of carbonate ions ($CO_3^{2-}$) in which case oxygen gas acts as the reducing species. These reactions are represented in TABLE 1, below:

TABLE 1

| Ion Transported | Reduction Reaction | Example Membranes | Example Catalysts | Min. Specific Energy (kJ/mol) |
|---|---|---|---|---|
| Peroxydicarbonate | $2CO_2 + O_2 + 2e^- \rightarrow [C_2O_6]^{2-}$ | poly(EMIM)TFSI | Pt, glassy carbon, Pd, In, Pb, Sn | 100 |
| Formate | $CO_2 + H^+ + 2e^- \rightarrow [HCOO]^-$ | N-vinyl imidazolium formate, N-allylphosphonium formate | In, Pt, Pd, Ag, Ni, Cu, or $Pd_xPt_{100-x}$ | 100 |
| Oxalate | $2CO_2 + 2e^- \rightarrow [C_2O_4]^{2-}$ | 1-ethyl, 3-methyl imidazolium hydroxide | In, Pt, Pd, Ag, Ni, Cu, In Sn, Pb, or $Pd_xPt_{100-x}$ | 200 |
| Trifluoroacetate | $CO_2 + CF_3^+ + 2e^- \rightarrow [C_2F_3CO_2]^-$ | 1-vinylimidazolium trifluoroacetate | In, Pt, Pd, Ag, Ni, In, Sn, Pb, Cu, or $Pd_xPt_{100-x}$ | 200 |

These reduced species can be reversibly transported across the membrane and thereby used to electrochemically pump $CO_2$. Operation at elevated potential increases the specific energy consumption for $CO_2$ removal. Alternative $CO_2$ reduction reactions can result in reduced energy consumption by decreasing the number of electrons consumed per molecule of $CO_2$ removed.

One exemplary cross-linked poly(ionic) liquid membrane preferentially allows peroxydicarbonate ion ($C_2O_6^{2-}$) transport, which is the reduction product of $CO_2$ and $O_2$, to pass through the membrane and oxidize the $C_2O_6^{2-}$ ionic carrier species 47 back to $CO_2$ and $O_2$, as illustrated in FIG. 2. One example membrane 34 is a peroxydicarbonate ion ($C_2O_6^{2-}$)-conducting poly(ionic) liquid membrane that has high ionic conductivity, mechanical stability, and no gas cross-over. In one embodiment, an electrochemical cell using a peroxydicarbonate ion ($C_2O_6^{2-}$) conducting solid electrolyte membrane that employs electrochemical $CO_2$ removal and/or electrochemical $CO_2$ sensing in an indoor environment, includes a mechanically stable poly(ionic) liquid membrane that preferentially transports the peroxydicarbonate ions, while immobilizing the other possible mobile species of the ionic liquid, and a cross-linked PIL membrane that will not allow gas cross-over between the anode and cathode sides thus acting as a gas barrier.

In one embodiment, the membrane is free or substantially free of quinones, such as menaquinone and ubiquinone (Coenzyme Q10). By substantially free, it is meant that the membrane comprises less than 1 wt. % quinones.

Figure 6:
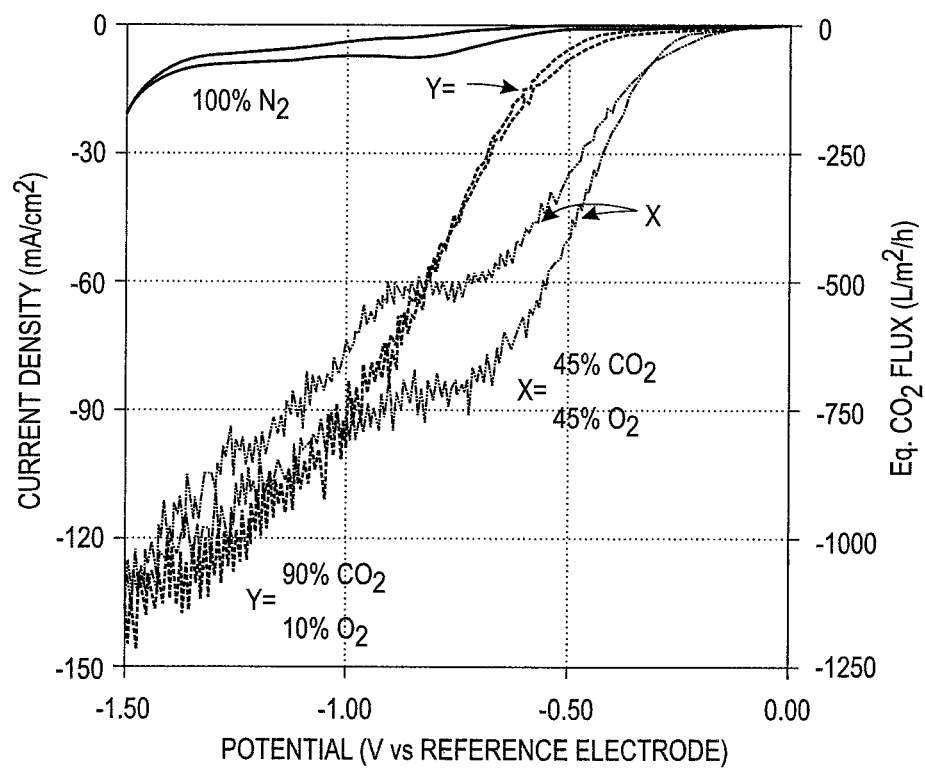
FIG. 6 illustrates a set of layers of an electrochemical device incorporating an additional carbon dioxide capture layer which may be used in the apparatus of FIGS. 1-4.

As an example, FIG. 6 illustrates results of cyclic voltammetry for a prototype device (a three-electrode system set up in a beaker) using a liquid electrolyte comprising 1-ethyl-3-methylimidazolium trifluoromethanesulfonate. During operation, $O_2$ and $CO_2$ from indoor air are reduced to form peroxydicarbonate ions ($C_2O_6^{2-}$) at the cathode in the presence of a $CO_2$-selective electrolyte membrane. An overpotential of up to −0.6 V (vs Ag|Ag$^+$ reference electrode), is applied at the cathode to drive the $CO_2$ reduction reaction. An additional potential of +0.4 V (vs Ag|Ag$^+$ reference electrode) is applied at the anode to drive the oxidation of the peroxydicarbonate ions to $CO_2$ and $O_2$ at the anode. The following reactions take place:

| Process | Reaction | Potential |
|---|---|---|
| Removal | $2CO_2 + O_2 + 2e^- \rightarrow [C_2O_6]^{2-}$ | $E_c = (0, -0.6)$ V vs Ag|Ag$^+$ |
| Rejection | $[C_2O_6]^{2-} \rightarrow 2CO_2 + O_2 + 2e^-$ | $E_a = (0, 0.4)$ V vs Ag|Ag$^+$ |

See, Gary B. Dunks and D. Stelman (1983). "Electrochemical studies of molten sodium carbonate" Inorganic Chemistry 22 (15), 2168-2177).

Under typical cell operation, a maximum cell potential of 1 V is applied. The curve X in FIG. 6, representing 45% $CO_2$, 45% $O_2$, shows that, even in the presence of a significant amount of oxygen, $CO_2$ undergoes electrolysis, which would allow transport of the resultant ionic species ($C_2O_6^{2-}$) through the membrane. Note that this occurs in a two-to-one molar ratio with oxygen, so very little atmospheric oxygen (250 ppm of 210,000 ppm) is lost from the indoor air. In other exemplary embodiments, similar potentials can be used to transport (HCOO)$^-$ or oxalate ($C_2O_4$)$^{2-}$ ions across the membrane during operation of the electrochemical device.

It is estimated that a current of 6 A operating at 10 V should be sufficient to process 50 L/h of $CO_2$ (using Faraday's law of electrolysis) in an electrochemical device of the type illustrated in FIGS. 3-4. A total power consumption of 73.4 W, when including thermal and flow control, using a current of 6 A and operating a 10-cell electrochemical device stack at 10 V, assuming 97% efficiency, can be calculated from the cyclic voltammogram shown in FIG. 6. The power required to heat the electrochemical device is estimated to be 11.9 W for a 1 cm-thick fiberglass insulation (0.04 W/m.K) over a 10 cm×10 cm×8.5 cm electrochemical device of the type illustrated in FIGS. 3 and 4.

In another embodiment, formate ions, as the ionic carrier species 47, are preferentially transported. A polymer electrolyte membrane 34 synthesized from a cross-linked ionic liquid may be used. The specific energy consumption which can be achieved (100 kJ mol$^{-1}$ $CO_2$ removed) is at least an order of magnitude lower than conventional sorbents for $CO_2$ removal from ambient air. The membrane may have a high formate ionic conductivity (e.g., 5×10$^{-4}$ S/cm). A non-aqueous, non-volatile plasticizer, such as ethylene carbonate, and/or a low $T_g$ crosslinker, such as poly(ethylene oxide) or poly(ethylene glycol) may be incorporated in the membrane to improve formate ion transport. The faradaic efficiency of the $CO_2$ reduction can be increased by using In, Pt, Pd, Ag, Ni or $Pd_xP_{100-x}$ bimetallic catalysts, and reducing the system operating voltage. Other details of such an electrochemical device are provided in the examples below.

In another embodiment, the ionic carrier species 47 include oxalate ions. This may be achieved by the use of a membrane containing one of the oxalate- ($C_2O_4$)$^{2-}$ or polymerized hydroxide-based ionic liquids such as 1-ethyl, 3-methyl imidazolium hydroxide, or poly(EMIM) hydroxide [EMIM=1-Ethyl-3-methylimidazolium]. These reactions each consume only one electron per mole of $CO_2$, halving the consumption relative to the $CO_2$ reduction to formate. The oxygen reduction reaction in ionic liquid hydroxides yields the bicarbonate which is known to be more reversible in ionic liquids. The membrane may have an area-specific resistance of less than 10 Ω cm$^2$.

In the case of an oxalate-based membrane, the $CO_2$ reduction reaction consumes only 1 electron per $CO_2$ molecule, does not consume $O_2$, and does not consume $H_2O$, allowing for independent humidity control. This unique combination of factors makes oxalate or bicarbonate particularly useful in cases where controlling the levels of such gases is desirable or difficult.

The form factor of the electrochemical device 10 is relatively flexible. For example, to achieve a minimum volume, the electrochemical device may occupy a volume of as little as about 0.00085 m$^3$. This system volume is calculated using a current density of 0.09A/cm$^2$ (peak current density from the cyclic voltammogram of FIG. 6) to get the surface area of the cell required to process 50 L/h (60.3 A) and assuming a 4 cell stack with a cell thickness of 5 cm that includes bipolar plates and plastic body. System dimensions can be modified to accommodate whatever form factor is desired.

The electrochemical device 10 may be retrofitted to reduce the energy demand of existing heating, ventilation and air conditioning (HVAC) systems in commercial buildings. By reducing the outdoor air retake ventilation frequency required to dilute indoor $CO_2$ levels, this system could achieve annual energy savings of up to 1.35 quads (1.42×10$^{12}$ MJ) when implemented across all the commercial buildings in the United States.

As will be appreciated, the electrochemical reduction of $CO_2$ is a complex reaction. Multiple products can be evolved (e.g., hydrogen, methane, ethane, methanol, formate, etc.) depending upon the catalyst and electrolyte. In some cases, it may be difficult to achieve 100% conversion efficiency for $CO_2$ to the ion of interest (e.g., peroxydicarbonate, formate, bicarbonate or oxalate) and the resulting imbalance between the anodic and cathodic reaction efficiency may lead to electrolyte degradation and loss of system performance. The system can be maintained at an optimal (healthy) level of operation by balancing undesirable reactions occurring at the electrodes. For example, the cell can be operated at a potential higher than the potential required for water electrolysis (E=1.23 V), ensuring that any parasitic $H_2$ evolution losses at the cathode are compensated for by an equivalent amount of oxygen evolution. The impact on the Faradaic efficiency is expectedly small for effective $CO_2$ reduction catalysts (>90%). The cell potential may be dynamically controlled based on the concentration of the measured product gas. In one embodiment, sensors 60, 61 are used to detect concentrations of one or more gases in the electrochemical device and/or entering or leaving the electrochemical device. To avoid the need for multiple sensors, a correlation between the cell potential, temperature and incoming/effluent gas concentration may be programmed into the controller 58.

The $CO_2$ electrochemical device can be operated below 70° C., or below 50° C., or below 40° C., to ensure a high $CO_2$ removal flux without impacting the thermal load for an air conditioning system, e.g., the exhaust gas temperature is maintained at an acceptable temperature without needing cooling, e.g., from 10-50° C. In some embodiments, heat may be applied to the electrochemical device, e.g., when it operated to concentrate carbon dioxide for an indoor environment, such as a greenhouse.

The electrochemical device 10 illustrated in FIGS. 1-5 is suited to making indoor environments more comfortable by maintaining the indoor $CO_2$ concentration as low as about 1,000 ppm, or lower, by selectively removing $CO_2$ from indoor environments.

A partial pressure of carbon dioxide in the product gas (output through vent 55) may be within the range 0.001 bar (1.02 $g/cm^2$) to 0.01 bar (10.2 $g/cm^2$) when the electrochemical device 10 is used for carbon dioxide removal. When the electrochemical device 10 is used for carbon dioxide concentration, as described below, a partial pressure of carbon dioxide in the product gas (output through vent 56) may be greater than 0.1 bar (102 $g/cm^2$), e.g., up to 100 bar (102,000 $g/cm^2$).

Figure 7:
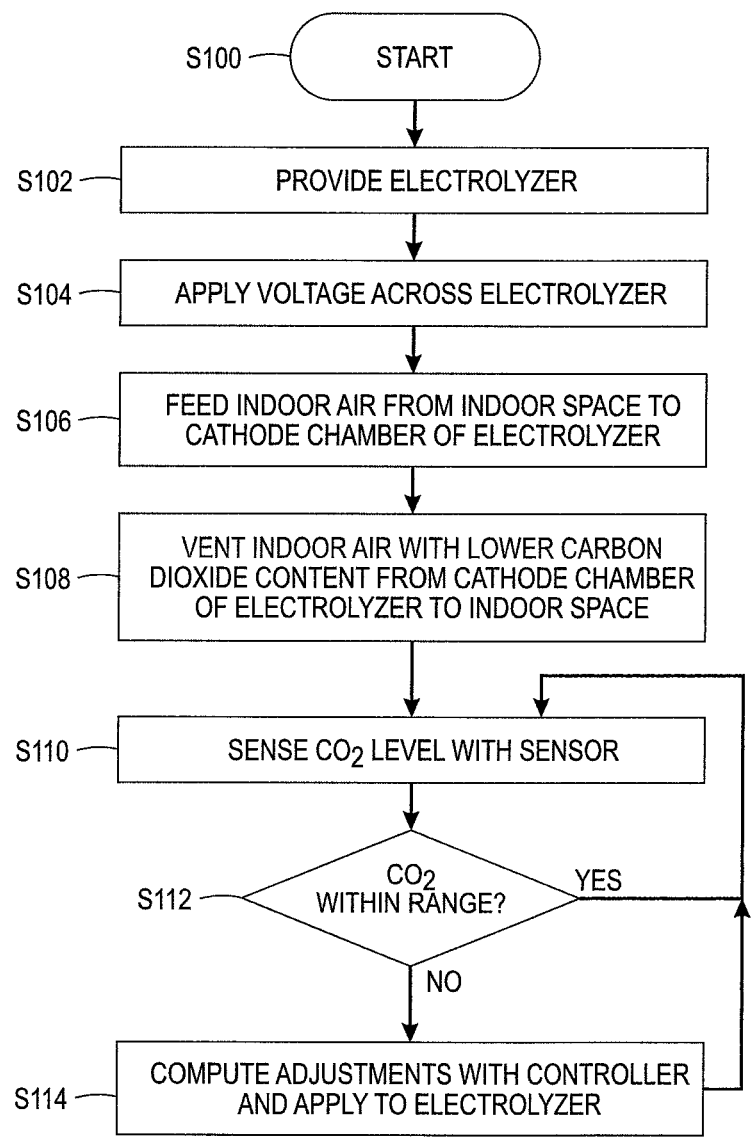
FIG. 7 illustrates a method of electrolytic removal of carbon dioxide.

With reference to FIG. 7, a method of removing $CO_2$ from indoor environments is shown. The method begins at S100. At S102, an ionic liquid-based electrochemical device 10 is provided. At S104, a voltage is applied across the electrochemical device cell. At S106, indoor air is fed to the cathode chamber. The electrochemical device electrochemically reduces $CO_2$ and $O_2$ in the input indoor air to ionic carrier species 47 (e.g., peroxydicarbonate ions ($C_2O_6^{2-}$)), which are ionically transported through the PIL membrane 34 and oxidized back to $CO_2$ and $O_2$.

At S108, the $CO_2$ generated at the anode can be vented out to the atmosphere, thus reducing the indoor $CO_2$ level to as low as about 1000 ppm, or below.

At S110, at intervals, the $CO_2$ level at one or more locations in the apparatus 1 and/or environment is measured with a sensor 60, 61.

If at S112, the controller 58 determines that the $CO_2$ level is not within a predetermined range, the method proceeds to S114, where adjustments to the electrochemical device 10 are made, and then returns to S110. Otherwise, the method proceeds directly to S110. The method can proceed in this way until $CO_2$ adjustments are no longer needed, such as when the building is not occupied by people, or maintained in continuous operation.

Formation of the Membrane

In accordance with one embodiment, a method of forming a solid membrane 34 for the electrochemical device includes polymerizing an ionic liquid, optionally in the presence of a crosslinker, optionally in the presence of a co-monomer. Any aprotic polymerizable ionic liquid with high $CO_2$ solubility can be formed into a poly(ionic) liquid membrane, depending on the application.

In one embodiment, the poly(ionic) liquid (PIL) membrane 34 may be formed by polymerizing one or more organic cations, as described above, or corresponding ionizable monomers or oligomers. The polymerization may be performed by self-polymerization of the organic cations/monomers/oligomers. Alternatively, polymerization may be performed by copolymerization with a second polymer-forming monomer, to form a polymer containing immobilized organic cations. An advantage of this method is that it allows the cation moiety to be grafted on to a polymer backbone formed from the polymerizable second monomer. The polymerization may be carried out in the presence of an initiator. In one embodiment, the anion component of the ionic liquid may be introduced after polymerization of the organic cations, e.g., by an ion exchange process. This allows $C_2O_6^{2-}$ ions to remain as the dominant mobile species 46. In this way, the transport of $C_2O_6^{2-}$ ions and its delivery at the anode can be enhanced, thus improving the performance of the $CO_2$ electrochemical device 10.

Suitable Initiators Include Azobisisobutyronitrile (AIBN).

In one specific embodiment, the poly(ionic) liquid (PIL) membrane 34 is prepared by direct synthesis. In this embodiment, The poly(ionic) liquid (PIL) membrane may be fabricated from an ionic liquid which includes at least one unsaturated polymerizable group (e.g., vinyl) at the cationic site, which can be cross-linked by free radical polymerization. The cross-linked PIL networks prepared from such monomers have exceptional stability against moisture and solvents, flexibility and higher mechanical stability than a non-cross-linked PIL membrane. In such a polymer electrolyte membrane, made by cross-linking an ionic liquid, the cation is immobilized along a polymer backbone, forming a poly(cation). This immobilization allows for the selective transport of the transportable ion 47 (e.g., formate ion), effectively making the membrane a single-ion conductor. Such a membrane is flexible and mechanically robust, and can be formed as thin films (<50 μm) to minimize the area specific resistance. When integrated into the exemplary ECR System, such a membrane allows for $CO_2$ removal with energy consumption as low as 100 kJ $mol^{-1}$ $CO_2$, which is over an order of magnitude lower than conventional systems.

In another embodiment, the poly(ionic) liquid (PIL) membrane may be prepared by functionalization of an existing ion-exchange membrane with an appropriate ionic liquid as an electrolyte.

The density of the crosslinker can be selected to achieve a desired film thickness and resiliency.

The membrane 34 may be formed by casting, doctor blading, spin coating, or other deposition technique suitable for forming a thin layer of uniform thickness in which the poly(ionic) liquid may be heterogeneously dispersed.

The anode and cathode catalyst layers 42, 45, may be formed by sintering, sputtering, thin layer metal sputtering, electroplating or other suitable method for depositing the catalytic material on the respective surfaces of the membrane 34.

An exemplary ECR system 1 may have a membrane flux of 160 L $CO_2$ $m^{-2}$ $h^{-1}$.

The operating voltage (V) of the electrochemical device (across the membrane) may be up to 1.5 V, e.g., at least 0.5 V, such as 1.0 V-1.3V. At an operating voltage of 1.0 V, complete conversion of $CO_2$ and formate can be achieved.

The energy consumption of the electrochemical device may be up to 300 kJ/mol $CO_2$ removed, or up to 200 kJ/mol $CO_2$ removed, or up to 100 kJ/mol $CO_2$ removed, or less. A consumption of 300 kJ/mol $CO_2$ removed, can be achieved, for example, by operation of the electrochemical device at 1.5 V with a $2e^-$ $CO_2$ reduction reaction. A consumption of 100 kJ/mol $CO_2$ removed, can be achieved, for example, by operation of the electrochemical device at 1.0 V with a 1e$^-$ $CO_2$ reduction reaction and the use of a highly-selective $CO_2$ reduction catalyst.

The conductivity of the formate ion (or other ion 47) in the electrochemical device membrane may be at least 0.5 mS cm$^{-1}$, or at least 1 mS cm$^{-1}$, or at least 2 mS cm$^{-1}$, or at least 2.8 mS cm$^{-1}$. Higher conductivities may be achieved by increasing formate loading, use of a low $T_g$ crosslinker, and/or by immobilize the poly(cation) to ensure single-ion conductivity.

The membrane 34 may have thickness of up to 100 μm, or up to 50 μm, or up to 25 μm. Particularly for thinner membranes, it may be advantageous to use spin coating to achieve thin, uniform polymer films and/or an electrically non-conductive particulate filler to improve membrane strength, such as silica particles, ceramic particles, glass particles, alumina ceramic particles, or any suitable type of particles. The size (mean diameter) of the electrically non-conductive particles may range from 2 to 15 μm.

The Faradaic efficiency of the electrochemical device is measured by the ratio of carbon dioxide removed from the feed gas to the amount of charge passed and may be at least 70%, or at least 80%, or at least 90%, or at least 95%, or at least 97%. The $CO_2$ reduction reaction is not expected to achieve a 100% faradaic efficiency. The resulting imbalance between the anodic and cathodic reaction efficiency may lead to electrolyte degradation. By operating the cell at a potential higher than that required for water electrolysis (E=1.23 V), any parasitic $H_2$ evolution losses at the cathode can be compensated for by an equivalent amount of oxygen evolution. The cell potential can be dynamically controlled based on the concentration of the measured product gas. To avoid extra sensors, this correlation between the cell potential, temperature and/or incoming/effluent gas concentration may be programmed into the controller.

The membrane can be operated at a $CO_2$ concentration of up to 5,000 ppm, or higher. In the example electrochemical device, a flux of at last 2 mol $CO_2$ m$^{-2}$ h$^{-1}$ or at least 2 mol $CO_2$ m$^{-2}$ h$^{-1}$ can be achieved with 5,000 ppm $CO_2$. Higher flux levels can be achieved with higher catalyst surface areas.

Some advantages of some of the electrochemical device of FIGS. 1-5 may include:

1. An electrochemical device 10 that is able to selectively remove $CO_2$ from indoor environments to below a safe $CO_2$ limit of about 1000 ppm.

2. Selective transport of peroxydicarbonate ion ($CO_6^{2-}$) ions (or other carrier species) across the membrane 34.

3. Substantial improvement in the maximum current density delivered by the electrochemical device.

4. Minimal or no gas crossover between the anode and cathode sides due to forming a gas-impermeable polymer matrix through an appropriate level of crosslinking.

5. Thermally and mechanically stable membrane at operating temperatures of up to 70° C., or above.

6. Improved longevity and performance of the electrochemical device by avoiding degradation.

7. A low specific energy consumption for electrochemical $CO_2$ removal (up to 300 kJ mol$^{-1}$ $CO_2$, or up to 100 kJ mol$^{-1}$ $CO_2$), which may be achieved with the present electrochemical device, allows for a more efficient way to remove indoor $CO_2$, rather than simply diluting it. In a $CO_2$-scrubbed building, VOC's and particulates could be removed with commercially available air filters, and the minimum ventilation rate would be dramatically reduced. As a precaution, the building ventilation could still be determined by the indoor concentration of volatile organic chemicals (VOCs), such as formaldehyde (EPA Report EPA 530-R-10-001 (2011), "Background Indoor Air Concentrations of Volatile Organic Compounds in North American Residences (1990-2005): A Compilation of Statistics for Assessing Vapor Intrusion"). Assuming typical building formaldehyde concentration (171 μg/m$^3$) as an air quality indicator (Kaden, et al., "WHO Guidelines for Indoor Air Quality: Formaldehyde," (2010)), the ventilation rate can be reduced by 85% compared to the $CO_2$ benchmark (http://www.engineeringtoolbox.com/pollution-concentration-rooms-d_692.html), while still maintaining formaldehyde concentration at OSHA permissible limits (0.75 ppm). This reduced ventilation rate would result in annual primary energy savings of up to 1.35 Quads (nearly 10% of all US commercial building HVAC energy) when implemented across all the commercial buildings in the United States, or 48 kWh/m$^2$/y.

This energy savings calculation assumes a baseline ventilation energy consumption in commercial buildings of 2.25 quads (primary fuel basis) across the United States (Zones 1-5), as estimated by the BTO calculator. It is assumed that the ventilation can be reduced to 15% of the baseline value (0.34 quads), by calculating the required ventilation rates for maintaining building air at 0.75 ppm formaldehyde and 1,000 ppm $CO_2$, respectively. The ECR system 1 can have a specific energy consumption of 100 kJ mol$^{-1}$ $CO_2$. A fuel-electricity conversion efficiency of 45% is assumed.

The economic analysis of the ECR System assumes that the specific capital cost will be comparable to a PEM fuel cell ($500 m$^{-2}$) (https://www.hydrogen.energy.gov/pdfs/15015_fuel_cell_system_cost_2015.pdf, and can be ultimately be further reduced by about 30% by avoiding the use of expensive platinum group metal (PGM) catalysts. Assuming a $CO_2$ generation rate of 50 LPH/occupant and a $CO_2$ membrane flux of 320 L/m$^2$/h, the estimated power consumption is 60W/person and the capital cost to remove the equivalent of 50 LPH/occupant is $52/occupant. A simple payback calculation is considered to recover the initial costs within 3 years, assuming an 85% reduction in the outdoor air ventilation rate.

These results are achieved through good ion transport in the system (high conductivity membrane) and fast kinetics (sufficiently good $CO_2$ reduction and re-oxidation). These are aided by one or more of casting the polymer into thin, mechanically stable films by casting, doctor blading or spin coating, improving ion transport by the use of low $T_g$ cross-linkers such as poly(ethylene glycol) or poly(ethylene oxide), increasing faradaic efficiency of the $CO_2$ reduction by using In, Pt, Pd, Ag, Ni or Pd$_x$Pt$_{100-x}$ bimetallic catalysts, and reducing the system operating voltage.

The installation cost for a commercial ECR system 1 operating at 1,000 ppm is estimated to be about $52/occupant, with a simple payback period of less than 3 years, based on January 2017 energy prices.

The exemplary ECR system addresses the high energy consumption of traditional HVAC systems by minimize the amount of building air that needs to be conditioned, rather than by trying to minimize the energy consumed in conditioning the building air. In contrast to current HVAC systems that maintain indoor air quality by constantly diluting unwanted gases, the ECR System selectively removes solely the unwanted gas ($CO_2$) from building air, while allowing for VOC's and particulates to be captured by commercially available air filters. The ECR allows for independent removal of $CO_2$ without affecting indoor humidity level, and unlike the previous electrochemical system, all ECR components are stable in the presence of oxygen. The ECR System can remove $CO_2$ with energy consumption as low as 100 kJ $mol^{-1}$ $CO_2$, which is over an order of magnitude lower than the state of the art. If successful, the ECR would solve the energy and cost challenges of the state-of-the-art solutions through creative system design and careful electrochemistry, saving 10% of U. S. commercial building HVAC energy.

Figure 8:
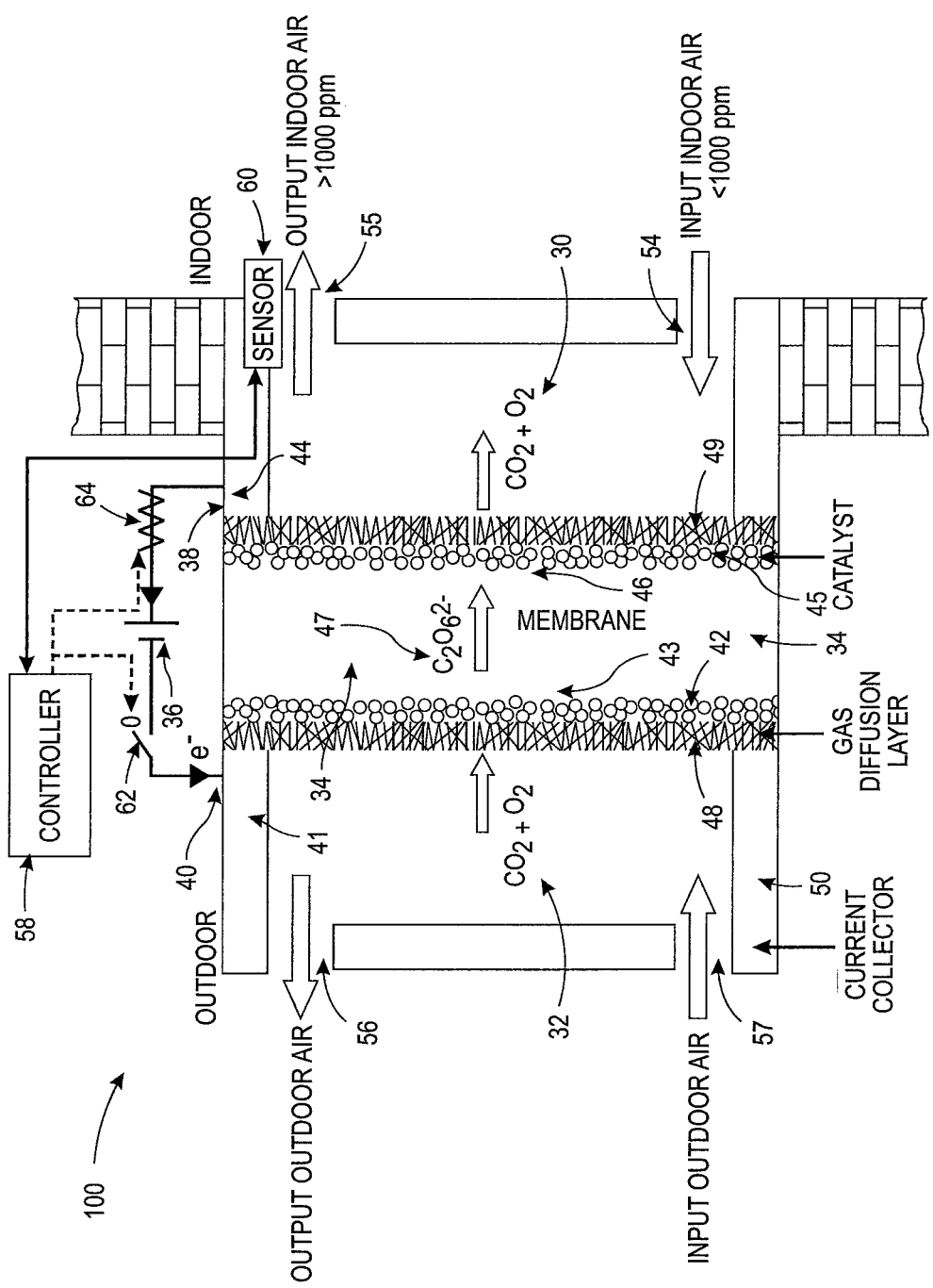
FIG. 8 is a side sectional view of an electrochemical device adapted for concentration of carbon dioxide in indoor air in accordance with one embodiment.

With reference to FIG. 8, in another embodiment, an electrochemical device 100 is configured for raising the partial pressure of carbon dioxide in an indoor atmosphere, such as in a greenhouse. The electrochemical device can be similarly configured to that shown in FIGS. 2-5, except as noted. In this embodiment, the electrochemical device is orientated with the anode chamber 30 receiving the indoor air through an inlet 54 connected to the air intake 14. After increasing the partial pressure of carbon dioxide, the indoor air is returned to the indoor environment via an outlet 54. The cathode chamber 32 receives outdoor air, containing at least a low level of carbon dioxide, via an inlet 57. Carbon dioxide from the outdoor air is reduced, by the catalyst layer 42, to transportable ions 46, which are transported across the membrane 34, before being reconverted to carbon dioxide by the catalyst layer 45. In this way, the system may be used to concentrate $CO_2$ in indoor air to provide higher concentrations for use in greenhouses.

As will be appreciated, the method of increasing the concentration of carbon dioxide in the interior space may be similar to that shown in FIG. 7. At S106, however, air from the interior space is fed to the anode chamber inlet, while a high $CO_2$ atmosphere is fed to the cathode chamber inlet. At S108, the interior air, with a higher level of $CO_2$, is vented from the anode chamber to the interior space via the anode chamber outlet. As in the method of FIG. 7, carbon dioxide is electrochemically reduced to ionic carrier species in the cathode chamber, the ionic carrier species are ionically transported through the membrane, and the ionic carrier species are electrochemically oxidized to form carbon dioxide in the anode chamber.

In another embodiment, the electrochemical device may be used as an electrochemical $CO_2$ sensor for regulating heating ventilation and air conditioning (HVAC) systems in indoor environments. In this embodiment, a perturbation in the ambient $CO_2$ concentration results in a measurable change in the electrochemical cell potential. This embodiment may be used for sensing the presence of $CO_2$ emitters, such as for person sensing, and for regulating HVAC loads for buildings. In this embodiment, the $CO_2$ gas concentration on a reference electrode (baseline) is maintained a constant value. A standard reference electrode may be used as well (silver, silver|silver chloride, Ferrocene|Ferrocenium).

EXAMPLES

Electrochemical Device for Carbon Dioxide Removal with Formate Ions

Figure 9:
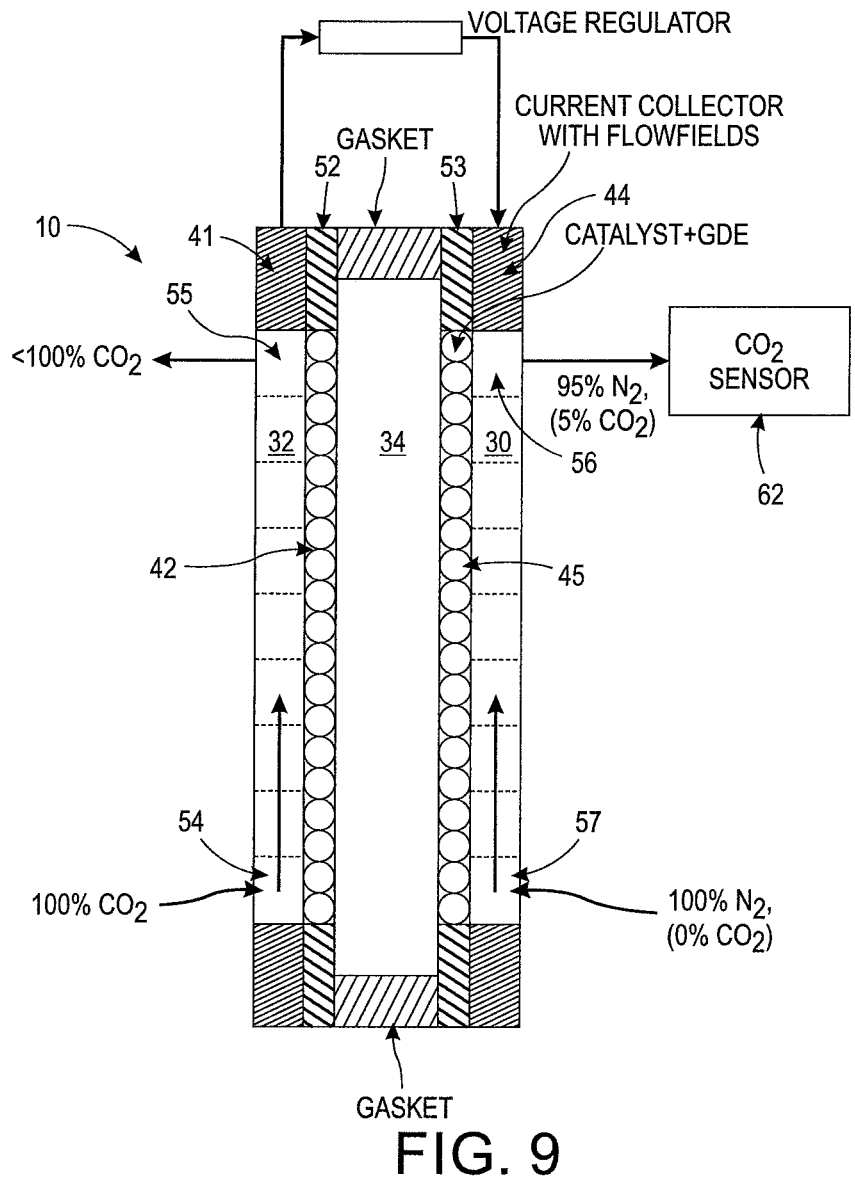
FIG. 9 illustrates a prototype electrochemical device.

A prototype electrochemical device (1.27 $cm^2$) 10 configured for removal of $CO_2$ and operating at room temperature (10-40° C.) is assembled as shown schematically in FIG. 9. The membrane is formed of an anion-exchange membrane equilibrated in either formic acid (96%) or potassium formate (0.5 M), and catalyst layers were used at both electrodes (Pt, 4 $mg/cm^2$). The polymer electrolyte membrane enables a high formate ionic conductivity (at least $1 \times 10^{-3}$ S/cm), and the commercially-available catalyst used reduces $CO_2$ to formate and re-oxidizes formate to $CO_2$ gas with a high faradaic efficiency (>20%).

In another implementation, the membrane is formed of poly(1-vinylimidazolium), according to the method described in U.S. Pub. No. 20160064763, published Mar. 3, 2016, entitled APPARATUS AND METHOD ASSOCIATED WITH REFORMER-LESS FUEL CELL, by Saroj Sahu using a method described for the synthesis of poly (ionic) liquids. (Yuan, J. and M. Antonietti, "Applications of Ionic Liquids in Polymer Science and Technology," D. Mecerreyes. Berlin, Heidelberg, Springer Berlin Heidelberg: 47-67 (2015)). An equimolar volume of formic acid is added dropwise to a cooled dispersion of 1-vinylimidazole in water (10 g) and stirred continuously for one day. The excess water is then evaporated to obtain a viscous dark ionic liquid monomer, 1-vinylimidazole formate. The monomer is purified by repeated washing with dehydrated diethyl ether followed by heating to 60° C. to remove traces of the solvent. The monomer is polymerized using free radical polymerization with 1 mol % azobisisobutyronitrile (AIBN) as an initiator and 5 weight % polyethylene glycol diacrylate (PEGDA), based on the total weight of the membrane, as a crosslinker to improve flexibility. The reaction mixture is bubbled with nitrogen gas and prepared for casting, degassed, and cast into a polytetrafluoroethylene (PTFE, Teflon®) mold.

The membrane formed (870 μm thick) is hydrophilic and has a room temperature hydrated conductivity of $2.8 \times 10^{-3}$ S/cm. The ionic conductivity of the formate membrane meets the target of $5 \times 10^{-4}$ S $cm^{-1}$. It is expected that the membrane area-specific resistance will be reduced to a target value of <10 Ω $cm^2$ by casting the membrane into thin films (about 50 μm).

It is expected that the addition of a non-aqueous, non-volatile plasticizer, such as ethylene carbonate, and a low $T_g$ crosslinker, such as poly(ethylene oxide) or poly(ethylene glycol) could improve formate transport. The density of the crosslinker can be selected to achieve a desired film thickness and resiliency. The glass transition temperature of the polymer can be adjusted by using a more flexible backbone to promote ion mobility.

The electrochemical device includes two catalyst gas diffusion electrodes, a polymer electrolyte membrane, and bipolar plates. The ECR system is located in-line with a centralized indoor air intake duct and is designed to operate at room temperature to purify air at typical indoor concentrations (700-1400 ppm $CO_2$), with a target $CO_2$ removal flux (16 moles per square meter of membrane material, per hour) when operating on 1,000 ppm $CO_2$ at room temperature. (The maximum rate of $CO_2$ removal is determined by the flux of the $CO_2$ reduction reaction. This is estimated by projecting data for the oxygen reduction reaction in a PEM fuel cell to low concentration and room temperature (Source: Benziger, Jay et al (2011), AIChE Journal, 57 (9), 2505-2517)).

The electrochemical device has a membrane flux of 160 L $CO_2$ $m^{-2}$ $h^{-1}$ at room temperature, with energy consumption of 300 kJ/mol $CO_2$ removed. A $CO_2$ removal flux of 2 mol $m^{-2}$ $h^{-1}$ is achieved. It is expected that a specific energy consumption of below 300 kJ $mol^{-1}$ $CO_2$ could be achieved by operating the electrochemical device at below 1.5 V. The specific energy could be reduced further (<100 kJ $mol^{-1}$ $CO_2$) by use of other $CO_2$ reduction catalysts and a more efficient ionic carrier (1 $e^-$ per $CO_2$ molecule).

The electrochemical device for $CO_2$ removal (ECR) compares favorably with other removal methods, such as over-ventilation ($CO_2$ Removal Energy, about 2.2 MJ $mol^{-1}$ $CO_2$) and $CO_2$ sorbents (1 MJ $mol^{-1}$ $CO_2$) while also allowing continuous operation.

An active potential is applied to the ECR System whenever the indoor $CO_2$ concentration increases, which electrochemically reduces $CO_2$ present in indoor air to the formate $(HCO_2)^-$ ion. The reduced ionic species is transported through the highly conductive solid electrolyte ($\kappa=2.8\times10^{-3}$ S cm$^{-1}$) to the outward-facing cathode, where the formate is re-oxidized and $CO_2$ is rejected to the outside air.

Reversibility

In such an electrochemical device, the products of the $CO_2$ reduction must compete with hydrogen evolution, which varies significantly depending upon the choice of electrolyte and catalyst material. The $CO_2/HCOO^-$ system has been previously demonstrated to be highly reversible (Rice, et al., "Direct formic acid fuel cells," Journal of Power Sources, 111(1), 83-89 (2002)). Preliminary experiments were performed in 0.1 M formic acid dissolved in 1-ethylimidazole with a Pt disk electrode.

Figure 10:
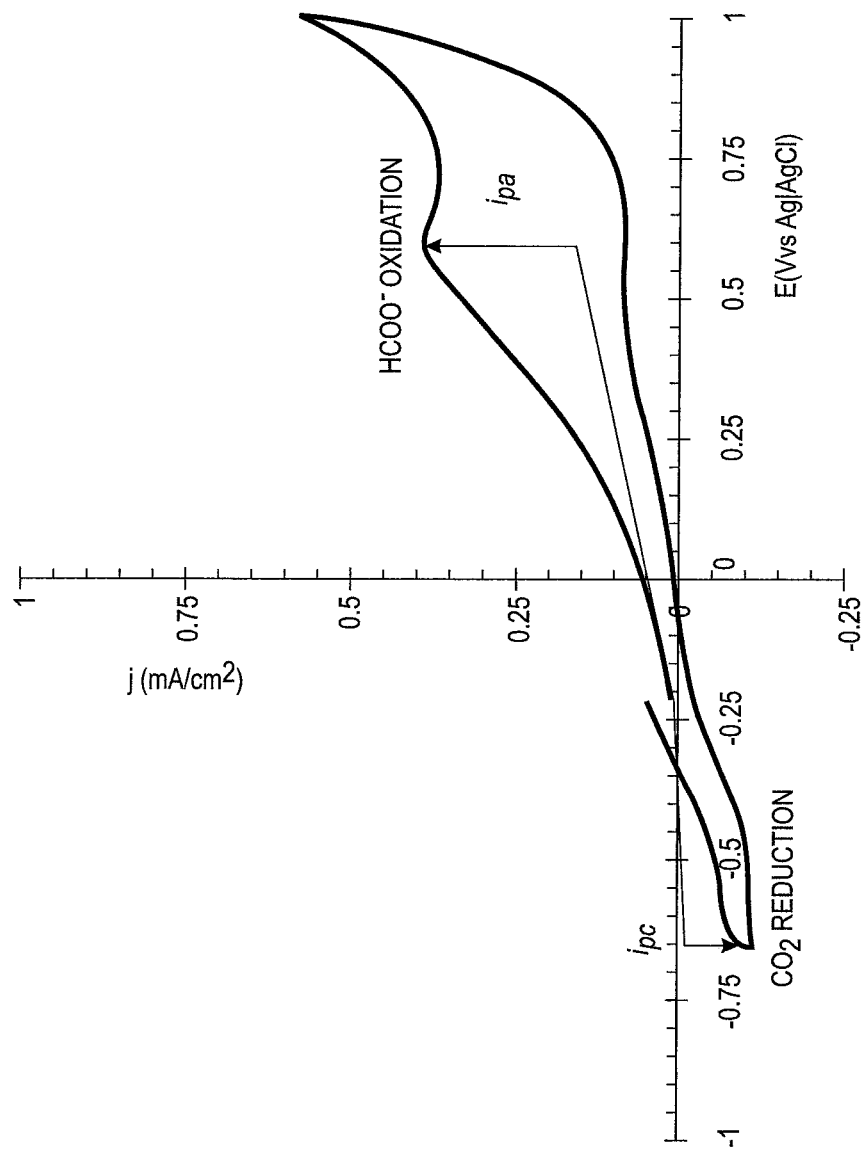
FIG. 10 is a cyclic voltammogram (10 mV s−1) of formic acid oxidation and subsequent $CO_2$ reduction at a platinum electrode electrolyte (0.1 M formic acid in ethyl imidazole, indicating a total kinetic overpotential of 0.5-1V.
Figure 11:
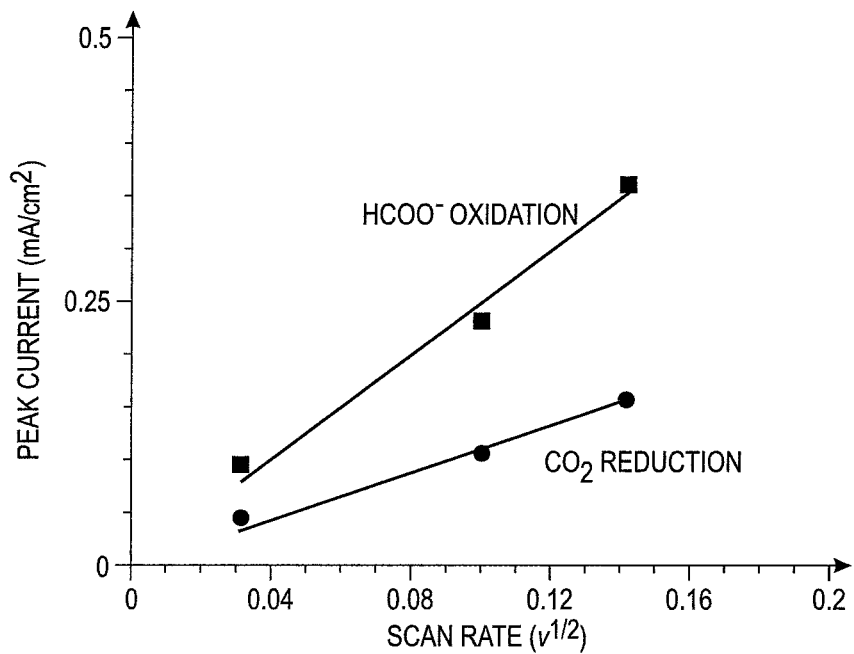
FIG. 11 is a graph of the peak redox current ($mA/cm^2$) plotted against the scan rate.

FIG. 10 shows a cyclic voltammogram (10 mV/s) of formic acid oxidation and subsequent $CO_2$ reduction at a Pt electrode electrolyte (0.1 M formic acid in ethyl imidazole), indicating a total kinetic overpotential of 0.5-1 V. FIG. 11 is a plot of the peak redox current plotted against the scan rate. The ratio of the oxidation and reduction peaks is indicative of quasi-reversible reaction kinetics.

As shown in FIG. 10, a peak for formate oxidation is observed at 0.6 V vs Ag|AgCl and a cathodic shoulder observed at −0.6 V is expected to correspond to $CO_2$ reduction. The ratio of the peak currents is 0.44, suggesting that the reactions are partially reversible. The irreversibility is likely due to the Pt electrodes becoming poisoned by the adsorption of $CO_2$ reduction intermediates. Improved reversibility is expected with the use of $Pd_xPt_{100-x}$ bimetallic catalysts (Ye, Y., et al., "High Hydroxide Conductivity in Polymerized Ionic Liquid Block Copolymers," ACS Macro Letters 2(7): 575-580 (2013), and indium catalysts which are known to be especially effective at promoting the reduction of $CO_2$ to formate (about 90% faradaic efficiency).

Figure 12:
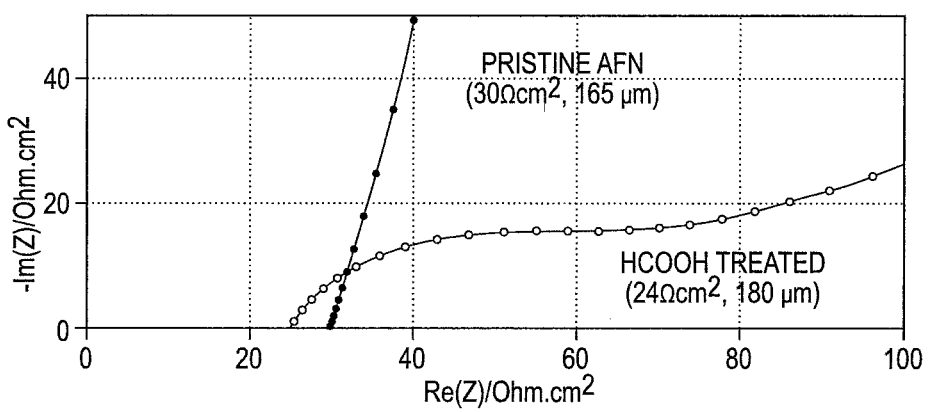
FIG. 12 is a Nyquist plot comparing the electrochemical response of a formate-conducting membrane with a commercially-available AFN anion exchange membrane.

FIG. 12 is a Nyquist plot comparing the electrochemical response of a formate-conducting membrane with a commercially-available AFN anion exchange membrane (persulfonated polybenzimidazole). The results indicate that the formate-conducting membrane performs better than a conventional membrane. The shape of the Nyquist plot also suggests the formate-conducting membrane has higher kinetic resistance.

While the preliminary data give confidence that reasonable fluxes can be achieved, it is expected that improvements can be made by increasing the conductance of the membrane by casting thin films, adding plasticizers, and tuning the glass transition temperature can enable high currents with low ohmic drop. Increasing the surface area of the catalyst and improving its contact with the electrode assembly can ensure that kinetic overpotentials do not limit $CO_2$ flux.

The results suggest that by selectively removing $CO_2$ from the air, the electrochemical device can reduce the outdoor retake ventilation portion of an HVAC load by 60%.

Electrochemical Device for Carbon Dioxide Pumping with Formate Ions

Figure 13:
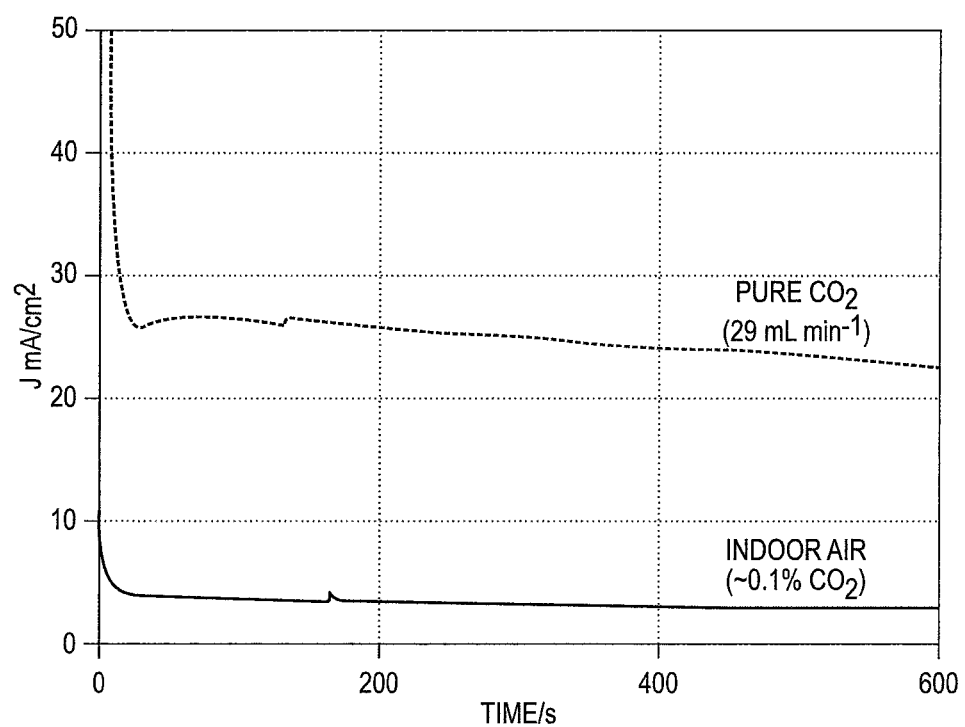
FIG. 13 shows current transient in electrochemical cell used for $CO_2$ removal from ambient air and a pure $CO_2$ feed.

An electrochemical cell for $CO_2$ pumping is fabricated, as follows. A formate-selective membrane is prepared by ion exchange of a commercial anion exchange membrane (for example, Astom AFN) with 96% formic acid for 72 hours. During the process, the mobile ions within the commercial membrane are replaced with formate groups. A membrane electrode assembly is prepared using the membrane and a Pt catalyst (Fuel Cell store, 4 mg cm$^{-2}$) and assembled in a cell with stainless steel current collectors having an electrochemical active area of 1.27 cm$^2$. The electrochemical device 10 is tested using ambient indoor air (0.1% $CO_2$) and pure $CO_2$ flowing at a constant flowrate of 20 mL min$^{-1}$. The carbon dioxide in the feed gas is extracted by applying a fixed potential (+1.5 V), which results in the reduction of $CO_2$ to formate, and its subsequent oxidation to $CO_2$ on the exhaust (e.g., outdoor) side. The current transient is demonstrated in FIG. 13, and corresponds to a high rate of $CO_2$ removal even though the device is operated at room temperature.

Time lapse photography of a $CO_2$ sensor located on the exhaust size was used to demonstrate the concentration of the $CO_2$ exhaust stream and simultaneous removal from a $CO_2$ feed.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. An electrochemical device comprising:
   a cathode chamber including an inlet which receives a feed gas comprising carbon dioxide;
   a reduction catalyst layer in the cathode chamber which electrochemically reduces carbon dioxide in the gas to form an ionic carrier species;
   an anode chamber;
   an electrolyte membrane which spaces the anode chamber from the cathode chamber, the membrane transporting the ionic carrier species between the cathode chamber and the anode chamber;
   an oxidation catalyst layer in the anode chamber which electrochemically oxidizes the ionic carrier species to form carbon dioxide; and
   an energy source, electrically connected with at least one of the reduction catalyst layer and the oxidation catalyst layer, which provides energy for the reduction and oxidation;
   wherein the electrochemical device changes the concentration of $CO_2$ in the feed gas; and
   wherein the electrolyte membrane comprises a crosslinked polymerized ionic liquid.

2. The electrochemical device of claim 1, wherein the reduction catalyst layer comprises indium, tin, lead, or glassy carbon.

3. The electrochemical device of claim 1, wherein the crosslinked polymerized ionic liquid is a polyelectrolyte derived by polymerization of a monomer with a polymerizable group.

4. The electrochemical device of claim 3, wherein the polymerizable group includes an alkenyl functional group.

5. The electrochemical device of claim 1, wherein the crosslinked polymerized ionic liquid of the electrolyte membrane includes organic cations selected from nitrogen-containing cations, phosphorus-containing cations, sulfur-containing cations, and combinations thereof.

6. The electrochemical device of claim 5, wherein the organic cations are selected from the group consisting of:
   1,3-dimethylimidazolium, 1,3-diethylimidazolium, 1-ethyl-3-methylimidazolium, 1,2-dimethyl-3-propylimidazolium, 1,3-dipropylimidazolium, 1-ethyl-3-propylimidazolium, 1,2-dimethyl-3-N-butylimidazolium, 1-ethyl-3-butylimidazolium, 1-methyl-3-octylimidazolium, 1-ethyl-3-octylimidazolium, 1-n-propyl-3-methylimidazolium, 1-n-propyl-3-ethylimidazolium, 1-butyl-3-methylimidazolium, 1-butyl-3-ethylimidazolium, 1-butyl-2,3-dimethylimidazolium, 1-butyl-2,3-diethylimidazolium, 1-hexyl-3-methylimidazolium, 1-hexyl-3-ethylimidazolium, 1-octyl-3-methylimidazolium, and 1-octyl-3-ethylimidazolium, 1-vinylimidazolium, 1-propynylimidazolium, 1-vinyl-3-ethenylimidazolium, 1-ethenyl-3-propynylimidazolium, 1,3-dipropynylimidazolium, 2-methyl-1-vinylimidazolium;

1-(2-methoxyethyl)-1-methylpyridinium, N-(3-hydroxypropyl)pyridinium, N-hexylpyridinium, and 1-ethenyl-3-propenylpyridinium, 2-vinylpyridinium, and 4-vinylpyridinium;

1-butyl-1-methylpyrrolidinium, N-butyl-N-methylpyrrolidinium, and 1-hexyl-1-methylpyrrolidinium, and 1-ethenyl-3-propenylpyrrolidinium;

trimethylbutylammonium, N-ethyl-N,N-dimethyl-2-methoxyethylammonium, tetrabutylammonium, n-hexyltriethylammonium, trimethyl-n-hexylammonium, and triethylbutylammonium;

trihexyl (tetradecyl)phosphonium and tris(n-hexyl) tetradecylphosphonium;

mixtures thereof; and polymers thereof.

7. The electrochemical device of claim 5, wherein the crosslinked polymerized ionic liquid of the electrolyte membrane includes nitrogen-containing organic cations selected from the group consisting of imidazolium, pyridinium, piperidinium, and pyrrolidinium-containing cations, organoammonium cations, polymers thereof, and mixtures thereof.

8. The electrochemical device of claim 1, wherein the crosslinked polymerized ionic liquid of the electrolyte membrane includes nitrogen-containing organic cations of the general form:

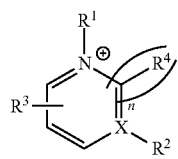

where $R^1$, $R^2$, $R^3$ and $R^4$ are independently selected from H, $C_1$-$C_{12}$ alkyl groups, $C_1$-$C_{12}$ alkenyl groups, $C_1$-$C_{12}$ alkoxy groups, $C_1$-$C_{12}$ hydroxyalkyl groups, $C_1$-$C_{12}$ hydroxyalkenyl groups, and combinations thereof, and wherein at least one of $R^1$, $R^2$, $R^3$ and $R^4$ is not H;

X is C or N; and n is 0 or 1.

9. The electrochemical device of claim 1, wherein the crosslinked polymerized ionic liquid includes anions selected from the group consisting of oxalate, formate, hydroxide, sulfonates, acetates, phosphates, carboxylates, borates, imide anions, amide anions, halides, sulfates, and mixtures thereof.

10. The electrochemical device of claim 1, wherein the crosslinked polymerized ionic liquid is selected from the group consisting of:

1-(3-methoxypropyl)-1-methylpiperidinium bis (trifluoromethylsulfonyl) imide, 1-(2-methoxyethyl)-1-methylpiperidinium tris-(pentafluoroethyl) trifluorophosphate, trihexyl (tetradecyl)phosphonium tris (pentafluoroethyl) trifluorophosphate, trihexyl (tetradecyl)phosphonium chloride, tris(n-hexyl) tetradecylphosphonium trifluorotris (pentafluoroethyl)phosphate, tris(n-hexyl)tetradecylphosphonium bis (trifluoromethylsulfonyl)imide, trihexyl(tetradecyl)phosphonium dicyanamide, N-allylphosphonium formate, 1-(2-methoxyethyl)-1-methylpyridinium tris (pentafluoroethyl)trifluorophosphate, N-(3-hydroxypropyl)pyridinium bis (trifluoromethylsulfonyl)imide, N-hexylpyridinium bis(trifluoromethylsulfonyl) imide, 1-butyl-1-methylpyrrolidinium trifluoromethanesulfonate, N-butyl-N-methylpyrrolidinium bis (trifluoromethanesulfonyl)imide, 1-hexyl-1-methyl-pyrrolidinium bis (trifluoromethylsulfonyl)imide, 1-butyl-1-methylpyrrolidinium trifluoroacetate, 1-ethyl-3-methylimidazolium tetracyanoborate, 1-methyl-3-octylimidazolium bis(trifluoromethylsulfonyl)imide, 1,2-dimethyl-3-N-butylimidazolium hexafluorophosphate, 1,2-dimethyl-3-propylimidazolium bis (trifluoromethylsulfonyl)imide, 1,3-dimethylimidazolium diphosphate, 1,3-dimethylimidazolium trifluoromethanesulfonate, 1-ethyl-3-methylimidazolium bis (trifluoromethylsulfonyl)imide, 1-ethyl-3-methylimidazolium ethylsulfate, 1-ethyl-3-methylimidazolium tetrafluoroborate, 1-n-propyl-3-methylimidazolium tetrafluoroborate, 1-butyl-3-methylimidazolium tetracyanoborate, 1-butyl-2,3-dimethylimidazolium trifluoromethanesulfonate, 1-butyl-2,3-methylimidazolium bis (trifluoromethanesulfonyl)imide, 1-butyl-3-methylimidazolium bis (trifluoromethylsulfonyl)imide, 1-butyl-3-methylimidazolium hexafluorophosphate, 1-butyl-3-methylimidazolium tetrafluoroborate, 1-n-butyl-3-methylimidazolium tetrafluoroborate, 1-hexyl-3-methylimidazolium chloride, 1-hexyl-3-methylimidazolium trifluorotris (pentafluoroethyl) phosphate, 1-hexyl-3-methylimidazolium bis (trifluoromethylsulfonyl)imide, 1-hexyl-3-methylimidazolium tetracyanoborate, 1-octyl-3-methylimidazolium chloride, N-vinyl imidazolium formate, 1-ethyl, 3-methyl imidazolium hydroxide, trimethylbutylammonium bis (trifluoromethylsulfonyl) imide, N-ethyl-N,N-dimethyl-2-methoxyethylammonium bis(trifluoromethylsulfonyl)imide, n-hexyltriethylammonium bis (trifluoromethylsulfonyl)imide, trimethyl-n-hexylammonium bis (trifluoromethylsulfonyl)imide, triethylbutylammonium bis (trifluoromethylsulfonyl)imide, tetrabutylammonium hexafluorophosphate, polymerizable unsaturated equivalents thereof, mixtures thereof, and polymers thereof.

11. The electrochemical device of claim 1, wherein the membrane is substantially impermeable to at least one gas, the at least one gas including oxygen.

12. The electrochemical device of claim 1, further comprising at least one of:

a gas diffusion layer in the cathode chamber adjacent the reduction catalyst layer;

a gas diffusion layer in the anode chamber adjacent the oxidation catalyst layer; and a carbon dioxide capture layer in the anode chamber, the carbon dioxide capture layer being spaced from the membrane by the oxidation catalyst layer.

13. The electrochemical device of claim 1, wherein the cathode chamber comprises an outlet which outputs the feed gas with a lower concentration of carbon dioxide than the feed gas received by the cathode chamber inlet.

14. The electrochemical device of claim 1, further comprising at least one of:
- a controller which controls a voltage across the membrane; and
- a carbon dioxide sensor which senses a carbon dioxide concentration in the electrochemical device.

15. An electrolytic carbon dioxide removal apparatus comprising the electrochemical device of claim 1 and conduits which connect the cathode chamber inlet and a cathode chamber outlet with an associated interior space, the electrochemical device reducing a partial pressure of carbon dioxide in the interior space.

16. An electrolytic carbon dioxide pumping apparatus comprising the electrochemical device of claim 1 and conduits which connect an anode chamber inlet and the anode chamber outlet with an associated interior space, the electrochemical device increasing a partial pressure of carbon dioxide in the interior space.

17. An electrochemical device comprising:
- a cathode chamber including an inlet which receives a feed gas comprising carbon dioxide;
- a reduction catalyst layer in the cathode chamber which electrochemically reduces carbon dioxide in the gas to form an ionic carrier species;
- a gas diffusion layer in the cathode chamber adjacent the reduction catalyst layer;
- an anode chamber;
- an electrolyte membrane which spaces the anode chamber from the cathode chamber, the membrane transporting the ionic carrier species between the cathode chamber and the anode chamber;
- an oxidation catalyst layer in the anode chamber which electrochemically oxidizes the ionic carrier species to form carbon dioxide;
- a gas diffusion layer in the anode chamber adjacent the oxidation catalyst layer;
- a carbon dioxide capture layer in the anode chamber, the carbon dioxide capture layer being spaced from the membrane by the oxidation catalyst layer; and
- an energy source, electrically connected with at least one of the reduction catalyst layer and the oxidation catalyst layer, which provides energy for the reduction and oxidation;
- wherein the electrochemical device changes the concentration of $CO_2$ in the feed gas.

18. A method for modifying carbon dioxide concentration in an interior space, comprising:
- providing the electrochemical device of claim 1;
- electrochemically reducing carbon dioxide to an ionic carrier species in the cathode chamber;
- ionically transporting the ionic carrier species through the membrane;
- electrochemically oxidizing the ionic carrier species to carbon dioxide in the anode chamber; and
- supplying gas from one of the cathode chamber and the anode chamber to the interior space to modify the carbon dioxide concentration in an interior space;
- wherein the ionic carrier species is selected from the group consisting of peroxydicarbonate anions, formate anions, oxalate anions, and mixtures thereof.

19. The method of claim 18, wherein a partial pressure of carbon dioxide in a product gas is within the range 0.001 to 0.01 bar, and wherein the method is used for carbon dioxide removal.

* * * * *